US012747834B2

(12) United States Patent
Brown

(10) Patent No.: US 12,747,834 B2
(45) Date of Patent: Sep. 29, 2026

(54) PRESSURE RELIEF SYSTEM, PRESSURE SAFETY DEVICE AND TOOL, PRESSURIZED CONTAINER SYSTEM, PROCESSES, AND METHOD OF USE

(71) Applicant: Kyle Brown, Ashville, NC (US)

(72) Inventor: Kyle Brown, Ashville, NC (US)

( * ) Notice: Subject to any disclaimer, the term of this patent is extended or adjusted under 35 U.S.C. 154(b) by 255 days.

(21) Appl. No.: 18/586,488

(22) Filed: Feb. 25, 2024

(65) Prior Publication Data

US 2024/0288128 A1 Aug. 29, 2024

Related U.S. Application Data

(60) Provisional application No. 63/448,294, filed on Feb. 26, 2023.

(51) Int. Cl.

| | |
|---|---|
| ***F17C 13/04*** | (2006.01) |
| ***B25B 13/50*** | (2006.01) |
| ***F16B 2/10*** | (2006.01) |

(52) U.S. Cl.

CPC .............. *F17C 13/04* (2013.01); *B25B 13/50* (2013.01); *F16B 2/10* (2013.01); *F17C 2205/0332* (2013.01)

(58) Field of Classification Search

CPC .. F17C 13/04; F17C 2205/0332; B25B 13/50; F16B 2/10

USPC ................................ 220/200, 320, 321, 319

See application file for complete search history.

(56) References Cited

U.S. PATENT DOCUMENTS

| | | | | |
|---|---|---|---|---|
| 2,761,707 A * | 9/1956 | Albert | F16L 23/10 | 285/353 |
| 2,915,330 A * | 12/1959 | Verbiar | B65D 45/32 | 292/256.67 |
| 5,333,747 A * | 8/1994 | Wike | F16B 17/004 | 29/525.02 |
| 5,411,162 A * | 5/1995 | Koziczkowski | F16L 23/10 | 220/4.07 |
| 5,584,410 A * | 12/1996 | Siblik | B65D 45/32 | 411/146 |

(Continued)

FOREIGN PATENT DOCUMENTS

| | | | |
|---|---|---|---|
| BR | PI0702533 A * | 6/2008 | F17C 1/06 |
| CN | 113833889 A * | 12/2021 | F16K 27/12 |

(Continued)

*Primary Examiner* — Orlando E Aviles
*Assistant Examiner* — Niki M Eloshway

(57) ABSTRACT

A pressure safety device and tool for operating said device, a pressurized container system, process, and methods of use are presented. The present disclosure provides a pressure relief valve that doubles as a tool to remove a tri clamp nut. The present disclosure further includes and provides the state of the art with a keyed pressure relief system for a pressurized container. Said another way, the present disclosure provides for a pressurized container, relief system, and tool for operation and safety. The present disclosure provides a removable pressure relief tool and a unique and novel new tri clamp nut assembly, and new tri clamp nut. The disclosure decreases the risk of injury associated with the accidental removal of a tri clamp fitting from pressurized vessels. Furthermore, the present disclosure provides a unique system which renders the tool inaccessible unless removed from the vessel, which causes depressurization.

19 Claims, 23 Drawing Sheets

(56) References Cited

U.S. PATENT DOCUMENTS

| | | | | | |
|---|---|---|---|---|---|
| 5,908,210 | A * | 6/1999 | Fetzer | F16L 37/002 285/368 |
| 6,053,078 | A * | 4/2000 | Parker | B25B 13/50 81/461 |
| 6,401,958 | B1 * | 6/2002 | Foss | F16J 13/06 220/320 |
| 7,533,699 | B1 * | 5/2009 | Cellemme | F16L 55/115 138/90 |
| 8,763,839 | B2 * | 7/2014 | Sakairi | F16J 13/065 220/320 |
| 2010/0025404 | A1 * | 2/2010 | Mehta | F16J 13/065 220/327 |
| 2010/0192344 | A1 * | 8/2010 | Zollmann | F16B 23/0007 411/407 |
| 2015/0152370 | A1 * | 6/2015 | Blichmann | C12C 13/10 99/276 |

FOREIGN PATENT DOCUMENTS

| | | | | |
|---|---|---|---|---|
| CN | 117128437 | A * | 11/2023 | F17C 13/084 |
| WO | WO-2011048686 | A1 * | 4/2011 | B65D 45/32 |

* cited by examiner

PRESSURE RELIEF SYSTEM, PRESSURE SAFETY DEVICE AND TOOL, PRESSURIZED CONTAINER SYSTEM, PROCESSES, AND METHOD OF USE

CROSS-REFERENCE TO RELATED APPLICATIONS

The present application claims priority to the U.S. Provisional Patent Application No. 63/448,294 which was filed on Feb. 26, 2023, which is hereby incorporated by reference herein in its entirety, including any figures, tables, or drawings.

FIELD OF THE INVENTION

This disclosure relates to a pressure relief system, a pressure safety device and tool for operating said device, a pressure relief lockout tool and tri clamp nut, a pressurized container system, process, and methods of use. More specifically, and without limitation, the present disclosure provides a pressure relief valve that doubles as a tool to remove a tri clamp nut. More specifically, and without limitation, the present disclosure provides a keyed pressure relief system for a pressurized container. More specifically, and without limitation, the present disclosure provides for a pressurized container, relief system, and tool for operation and safety.

BACKGROUND OF THE INVENTION

Pressurized vessels or containers are well known in the art. A pressurized container or vessel is a container designed to hold gasses and/or liquids at a pressure. Typically, this pressure is substantially different from ambient pressure. Pressurized vessels, especially highly pressurized vessels, can be dangerous. When pressurizing a vessel, if the vessel is not properly sealed and/or sealed without a pressure relief means, the pressurized vessel can be very dangerous. Explosions are very dangerous. Explosions can cause damage to the vessels themselves. Explosions or malfunctions can cause damage to nearby property. In some cases, malfunctions can also be deadly. Thus, pressurized vessel safety is extremely important.

Kegs are well known in the art. Kegs or pressurized beverage vessels may hold beer, wine, coffee, or other fluids and gasses used for consumption. Kegs are common throughout the industry for storage, transport and serving beverages, such as beer. Kegs are often constructed of steel or other metals so they can be pressurized. Beer kegs in particular, and those used in creating, making, or brewing beer need pressure relief to be able to be used safely. The process of brewing or fermentation of beer causes gasses to be released, which increases the pressure of the container. Thus, it is important to have a properly pressurized and properly functioning pressure relief mechanism to keep the beer safe to drink, while allowing the beer to ferment.

Pressure relief valves are known in the art. A relief valve or pressure relief valve is used to control or limit the pressure of a container. Pressure relief valves often fail or tend to function incorrectly or at incorrect levels. In other words, valves may release to soon or too late. This can result in incorrect brewing, storage, or even injury and accidents. Thus, properly functioning and easy to operate pressure relief valves are needed in the art. Especially, easy to operate and safely functioning valves which can provide very accurate pressures and pressure relief at exactly the right times and/or exactly at the right desired times.

Thus, there is a long-felt need in the art for improvements and/or new and well functioning relief valves. In particular, with respect to finely tuned craft beers and coffees, and the like, an exactitude and enhanced functionality of a pressure relief valve is desired. Liquid or drink kegs are just one example of a pressurized vessel and pressure relief application. Other examples are discussed herein. The present disclosure provides a pressurized container and unique valves that improve upon the state of the art. Furthermore, the present disclosure provides a new hand tool for operation of such that is new to the art.

For example, Ferrules and tri clamp fittings are used in a variety of applications and exist in the art today. In some applications, ferrules and tri clamp fittings are used in a variety of applications; such as, to secure pipes and accessories on pressurized vessels and devices.

Furthermore, in addition to those issues plaguing the art, the use of ferrules and tri clamps poses further complications and challenges for the state of the art. In the event a tri clamp is removed from a ferrule while the vessel or device is under pressure, a rapid decompression and release of gas, or release of a pressurized liquid can occur. This rapid release can potentially harm the equipment and/or operator. Current tri clamp lockout mechanisms do not provide a means of pressure relief for a tri clamp to be operated. Thus, the present disclosure provides a sequentially operated system for removal of a tri clamp nut tool and depressurization of a pressurized vessel before the tri clamp nut can be loosened and the tri clamp can be removed.

Furthermore, the present disclosure provides a removable pressure relief tool and a unique and novel new tri clamp nut assembly, and new tri clamp nut. The present disclosure improves upon the state of the art by providing the state of the art with a decrease in the risk of injury associated with the accidental removal of a tri clamp fitting from pressurized vessels. Furthermore, the present disclosure provides a unique system which renders the tool inaccessible unless removed from the vessel, which causes depressurization. Said another way, the present disclosure, and unique tri clamp nut further described herein, can not be removed without the tool.

The disclosure herein provides these advantages and others as will become clear from the specification and claims provided.

SUMMARY OF THE INVENTION

A pressure safety device and tool for operating said device, a pressurized container system, process, and methods of use are presented. More specifically, and without limitation, the present disclosure provides a pressure relief valve that doubles as a tool to remove a tri clamp nut. More specifically, and without limitation, the present disclosure provides a keyed pressure relief system for a pressurized container. More specifically, and without limitation, the present disclosure provides for a pressurized container, relief system, and tool for operation and safety. Said another way, the present disclosure provides a sequentially operated system for removal of a tri clamp nut tool and depressurization of a pressurized vessel before the tri clamp nut can be loosened and the tri clamp can be removed.

Furthermore, the present disclosure provides a removable pressure relief tool and a unique and novel new tri clamp nut assembly, and new tri clamp nut. The present disclosure improves upon the state of the art by providing the state of the art with a decrease in the risk of injury associated with the accidental removal of a tri clamp fitting from pressurized vessels. Furthermore, the present disclosure provides a unique system which renders the tool inaccessible unless removed from the vessel, which causes depressurization. Said another way, the present disclosure, and unique tri clamp nut further described herein, can not be removed without the tool.

Thus, it is a primary object of the disclosure to provide a pressure safety device and tool for operating said device, a pressurized container system, process, and methods of use that improves upon the state of the art.

Another object of the disclosure is to provide a pressure safety device and tool for operating said device, a pressurized container system, process, and methods of use that provides a new pressure relief valve.

Yet another object of the disclosure is to provide a pressure safety device and tool for operating said device, a pressurized container system, process, and methods of use that provides a new hand tool for operating a pressure relief valve.

Another object of the disclosure is to provide a pressure safety device and tool for operating said device, a pressurized container system, process, and methods of use that provides a new tri clamp nut.

Yet another object of the disclosure is to provide a pressure safety device and tool for operating said device, a pressurized container system, process, and methods of use that provides a pressure relief valve that doubles as a tool to remove a tri clamp nut.

Another object of the disclosure is to provide a pressure safety device and tool for operating said device, a pressurized container system, process, and methods of use that allows a valve to be operated in a pull-tab fashion.

Yet another object of the disclosure is to provide a pressure safety device and tool for operating said device, a pressurized container system, process, and methods of use that provides for a valve to be removed from the body of the vessel for use as a tool Another object of the disclosure is to provide a pressure safety device and tool for operating said device, a pressurized container system, process, and methods of use that cables the tool to the vessel.

Yet another object of the disclosure is to provide a pressure safety device and tool for operating said device, a pressurized container system, process, and methods of use that secures a tool to a vessel in a way that prevents the tool of a first vessel to be used on a second vessel.

Another object of the disclosure is to provide a pressure safety device and tool for operating said device, a pressurized container system, process, and methods of use that provides a new specialized tri clamp body.

Yet another object of the disclosure is to provide a pressure safety device and tool for operating said device, a pressurized container system, process, and methods of use that includes a new specialized tri clamp body that is keyed to a unique ferrule, adapter, and/or cap system.

Another object of the disclosure is to provide a pressure safety device and tool for operating said device, a pressurized container system, process, and methods of use that includes a new specialized tri clamp body which is notched to accommodate a protrusion on the ferrule, adapter, or cap.

Yet another object of the disclosure is to provide a pressure safety device and tool for operating said device, a pressurized container system, process, and methods of use that provides a specialized tri clamp nut.

Another object of the disclosure is to provide a pressure safety device and tool for operating said device, a pressurized container system, process, and methods of use that provides a non-standard thread.

Yet another object of the disclosure is to provide a pressure safety device and tool for operating said device, a pressurized container system, process, and methods of use that provides a specialized tri clamp nut which is only compatible with the system disclosed herein.

Another object of the disclosure is to provide a pressure safety device and tool for operating said device, a pressurized container system, process, and methods of use that provide a unique set of fittings.

Yet another object of the disclosure is to provide a pressure safety device and tool for operating said device, a pressurized container system, process, and methods of use that provide a new interlocking safety sequence.

Another object of the disclosure is to provide a pressure safety device and tool for operating said device, a pressurized container system, process, and methods of use that provides for preventing unwanted pressure relief or tampering.

Yet another object of the disclosure is to provide a pressure safety device and tool for operating said device, a pressurized container system, process, and methods of use that is easy to use.

Another object of the disclosure is to provide a pressure safety device and tool for operating said device, a pressurized container system, process, and methods of use that is safe to use.

Yet another object of the disclosure is to provide a pressure safety device and tool for operating said device, a pressurized container system, process, and methods of use that are accurate.

Another object of the disclosure is to provide a pressure safety device and tool for operating said device, a pressurized container system, process, and methods of use that are robust.

Yet another object of the disclosure is to provide a pressure safety device and tool for operating said device, a pressurized container system, process, and methods of use that are quick and efficient in operation.

Another object of the disclosure is to provide a pressure safety device and tool for operating said device, a pressurized container system, process, and methods of use that save time for a user.

Yet another object of the disclosure is to provide a pressure safety device and tool for operating said device, a pressurized container system, process, and methods of use that improve upon safety in the state of the art.

Another object of the disclosure is to provide a pressure safety device and tool for operating said device, a pressurized container system, process, and methods of use that provide a new system of pressure control.

Yet another object of the disclosure is to provide a pressure safety device and tool for operating said device, a pressurized container system, process, and methods of use that are high quality.

Another object of the disclosure is to provide a pressure safety device and tool for operating said device, a pressurized container system, process, and methods of use that provide for remote monitoring of pressure and vessel status.

Yet another object of the disclosure is to provide a pressure safety device and tool for operating said device, a pressurized container system, process, and methods of use that provide a computing platform and graphical interface for interacting with the pressurized vessel.

These and other objects, features, or advantages of the present disclosure will become apparent from the specification and claims.

BRIEF DESCRIPTION OF DRAWINGS

The drawings accompanying and forming part of this specification are included to depict certain aspects of the disclosure.

DESCRIPTION

Figure 1:
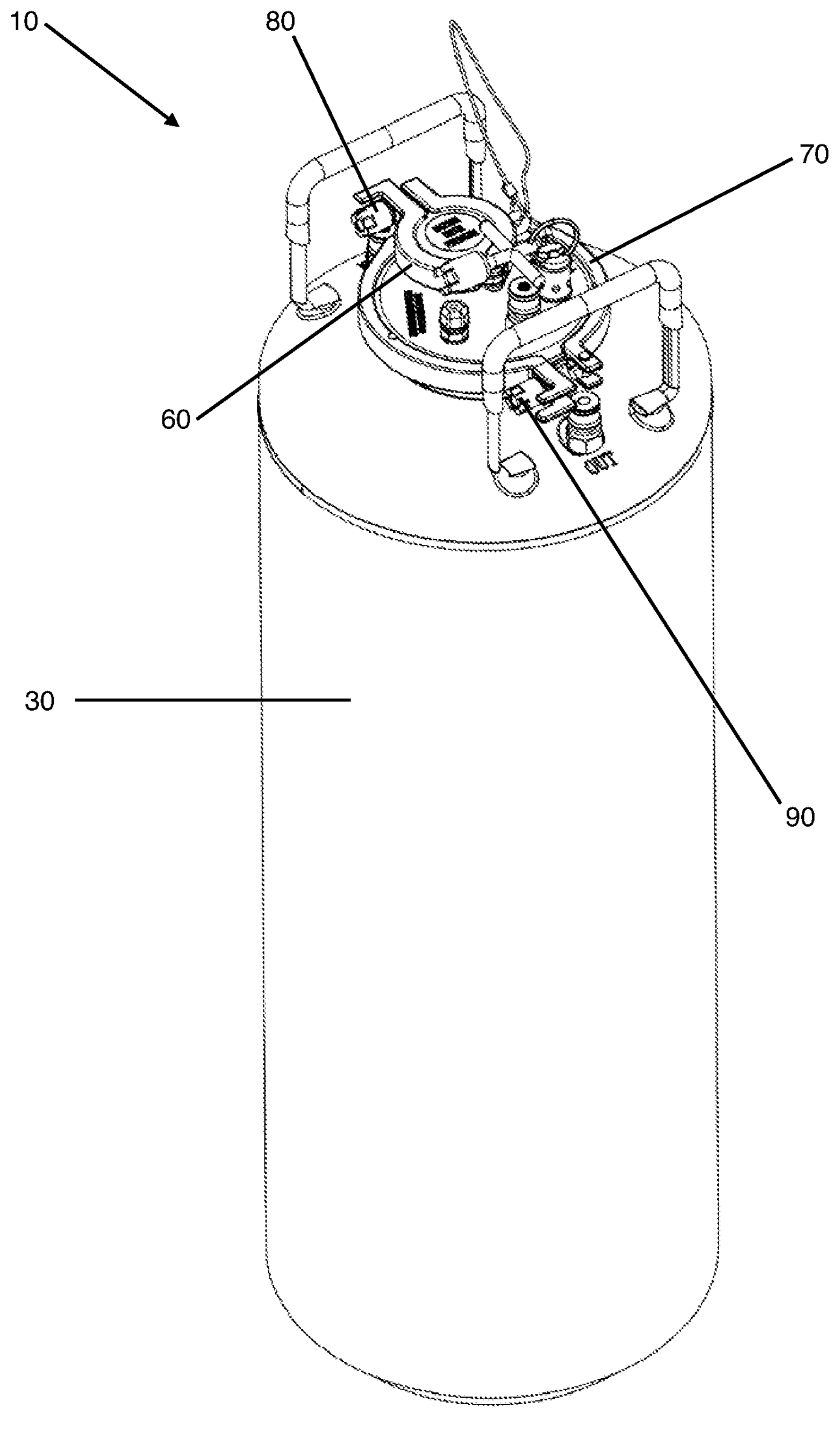
FIG. 1 is a top, perspective view; the view showing the pressurized vessel, the first tri clamp, the second tri clamp, the first tri clamp nut, and the second tri clamp nut.
Figure 2:
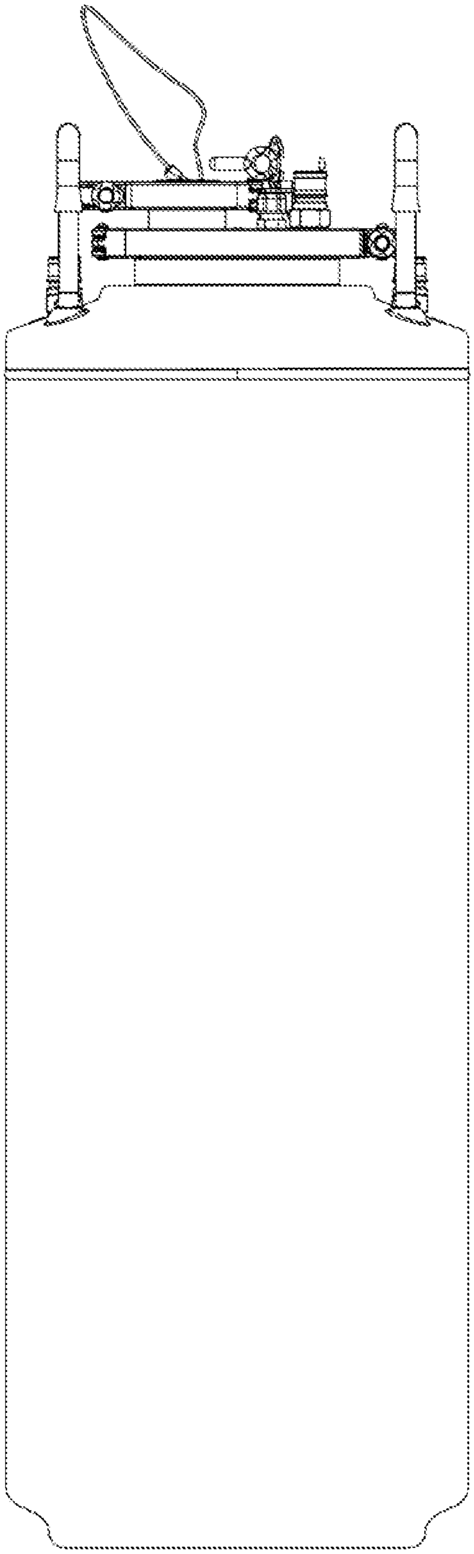
FIG. 2 is a side view; the view showing the pressurized vessel, the first tri clamp, the second tri clamp, the first tri clamp nut, and the second tri clamp nut; the view showing a plurality of handles; the view showing a hand tool; the view showing a cable securing the hand to to the pressurized vessel.
Figure 3:
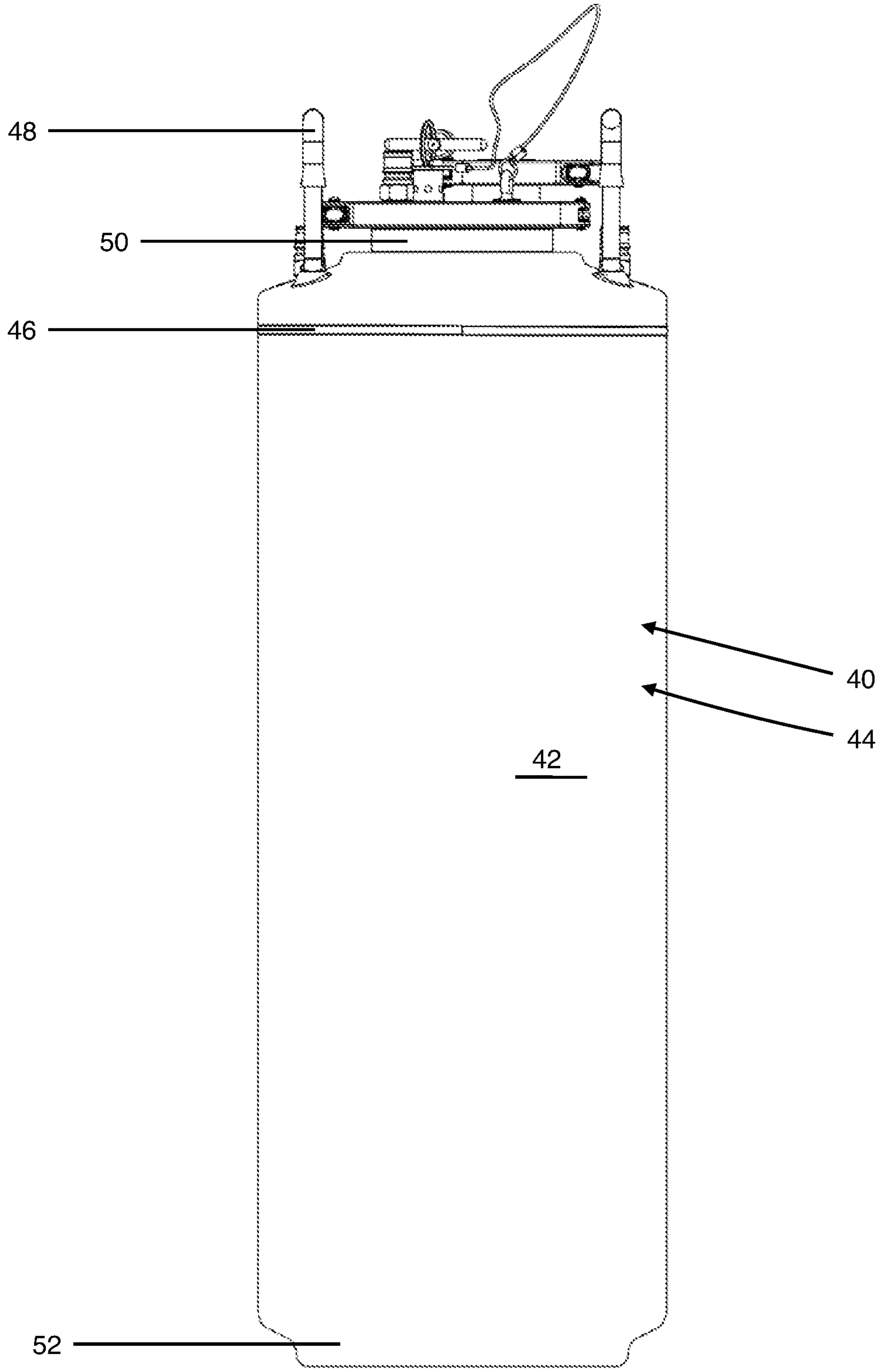
FIG. 3 is a side view; the view showing the pressurized vessel, the first tri clamp, the second tri clamp, the first tri clamp nut, and the second tri clamp nut; the view showing a plurality of handles; the view showing a hand tool; the view showing a cable securing the hand to the pressurized vessel.
Figure 4:
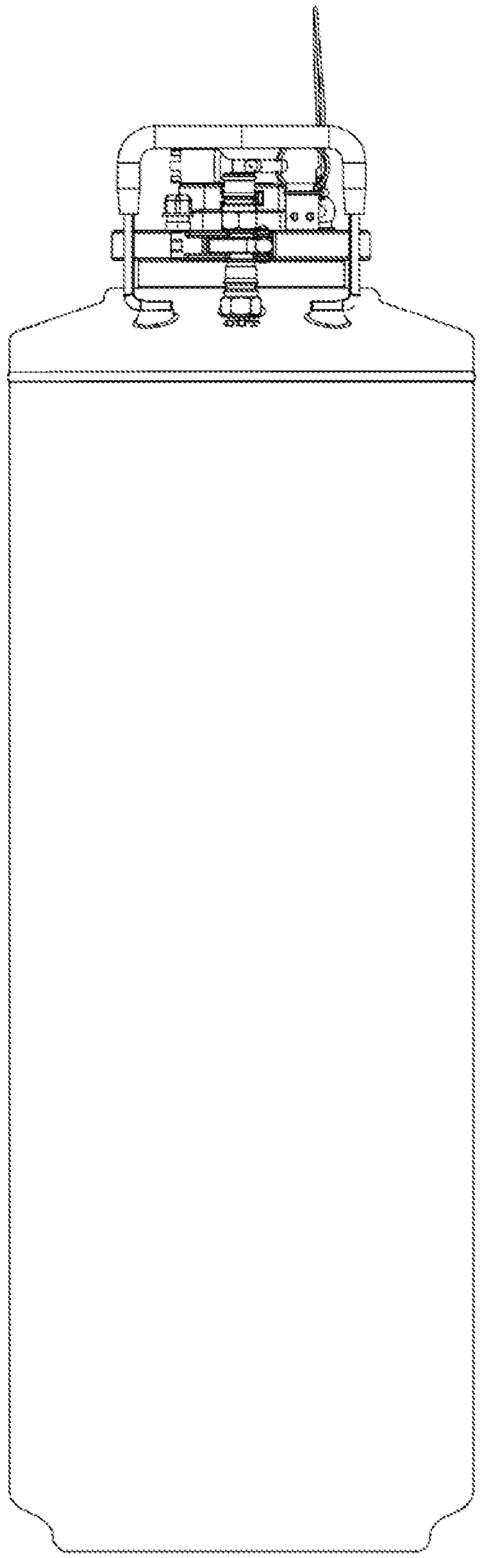
FIG. 4 is a side view; the view showing the pressurized vessel, the first tri clamp, the second tri clamp, the first tri clamp nut, and the second tri clamp nut; the view showing a plurality of handles; the view showing a hand tool; the view showing a cable securing the hand to the pressurized vessel.
Figure 5:
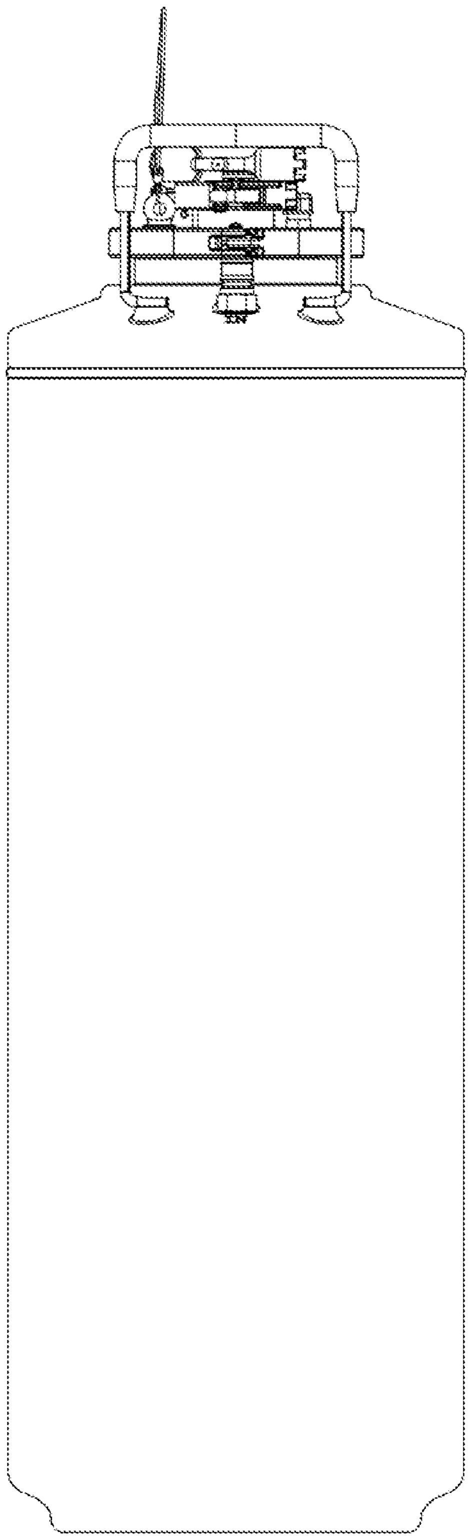
FIG. 5 is a side view; the view showing the pressurized vessel, the first tri clamp, the second tri clamp, the first tri clamp nut, and the second tri clamp nut; the view showing a plurality of handles; the view showing a hand tool; the view showing a cable securing the hand to the pressurized vessel.
Figure 6:
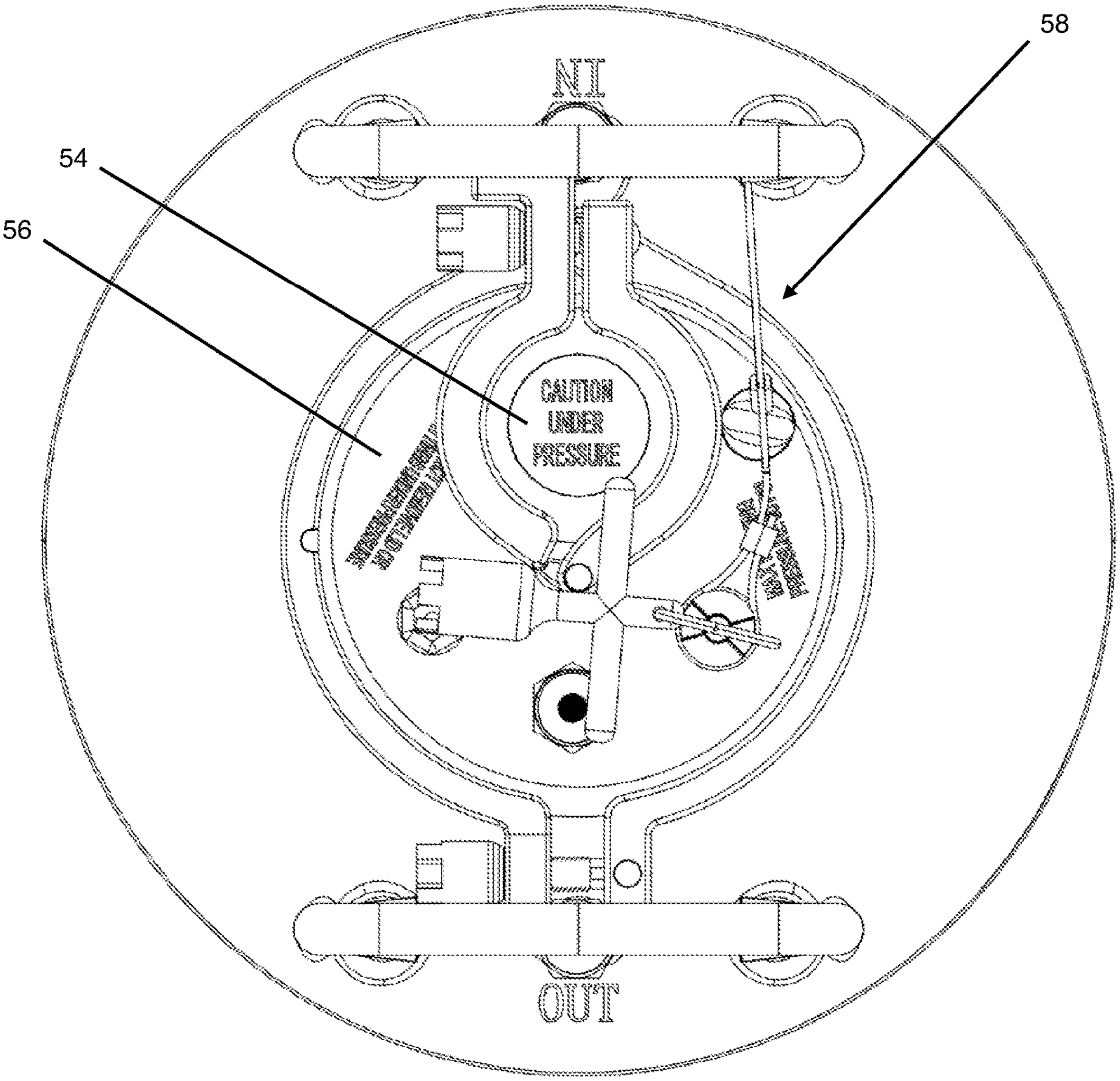
FIG. 6 is a top view; the view showing the pressurized vessel, the first tri clamp, the second tri clamp, the first tri clamp nut, and the second tri clamp nut; the view showing a plurality of handles; the view showing a hand tool; the view showing a cable securing the hand to the pressurized vessel.
Figure 7:
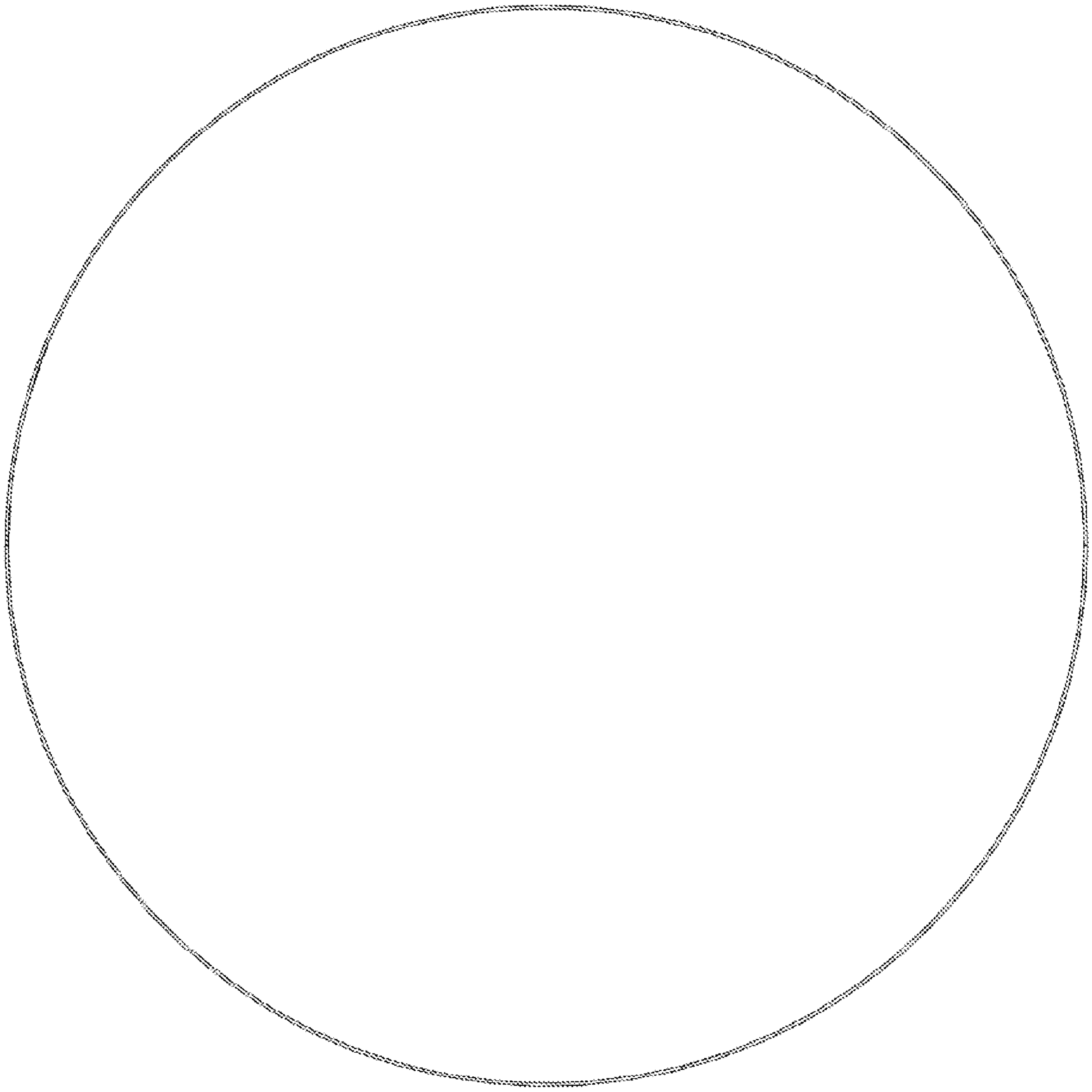
FIG. 7 is a bottom view; the view showing the base of the pressurized vessel.
Figure 8:
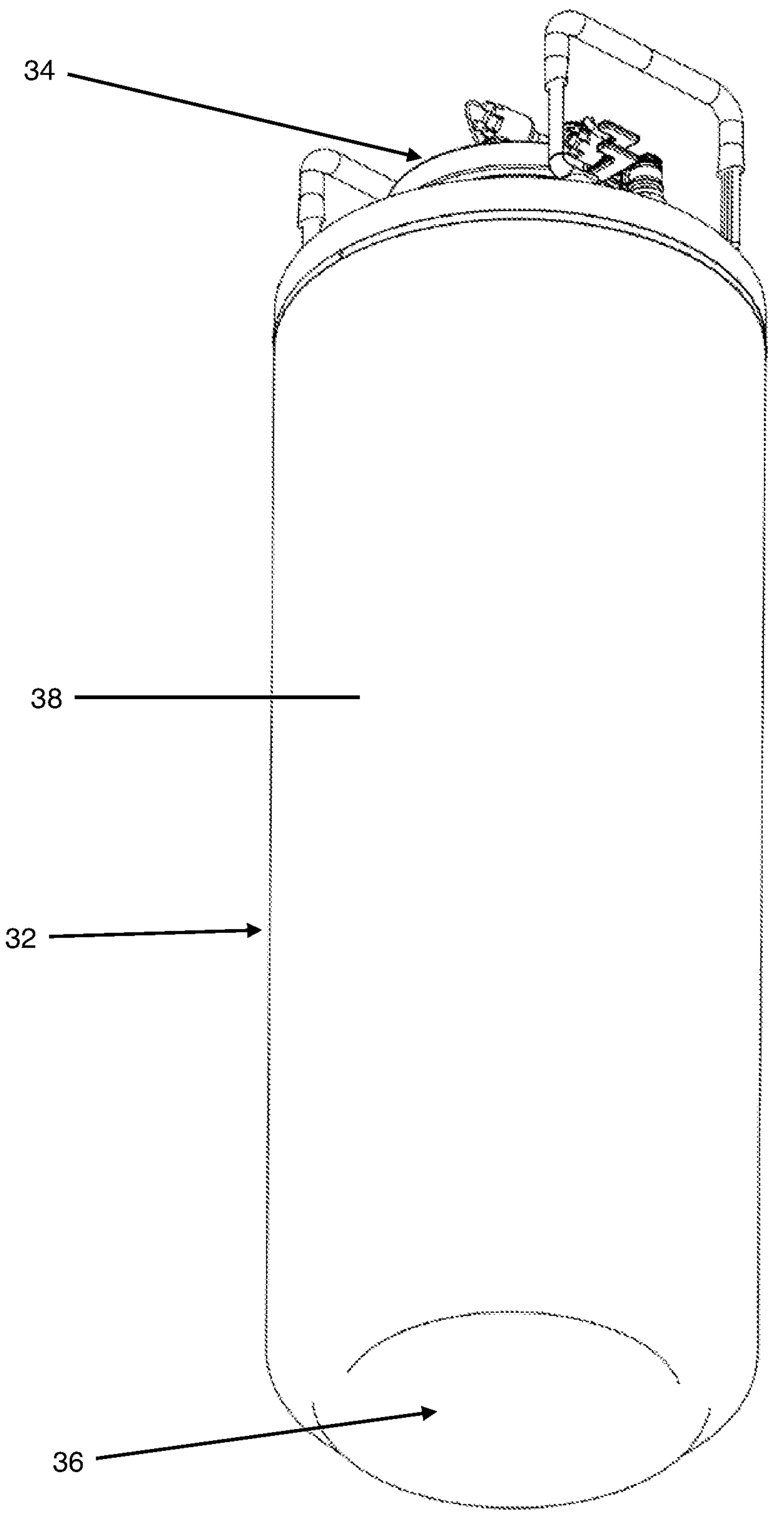
FIG. 8 is a bottom, perspective view; the view showing the pressurized vessel, the first tri clamp, the second tri clamp, the first tri clamp nut, and the second tri clamp nut.
Figure 9:
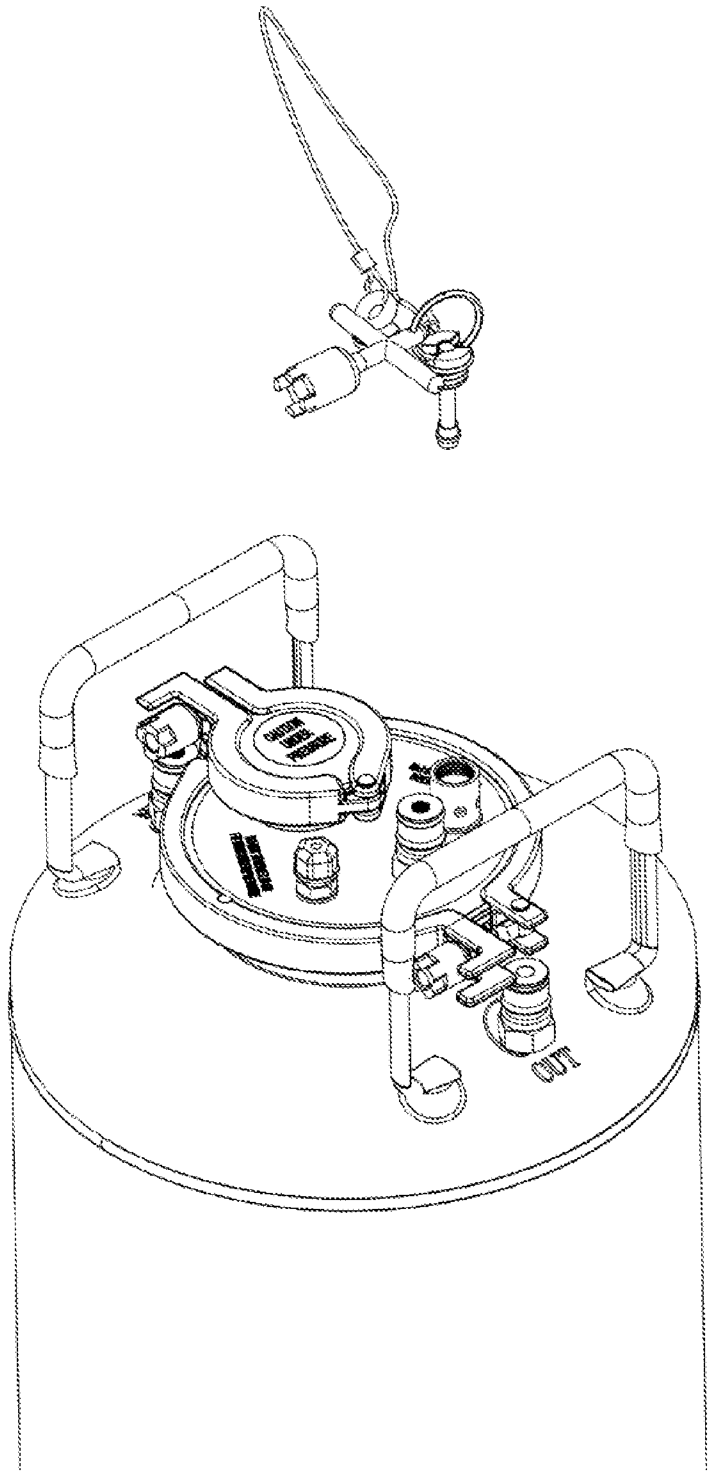
FIG. 9 is a top, perspective view; the view showing the pressurized vessel, the first tri clamp, the second tri clamp, the first tri clamp nut, and the second tri clamp nut; the view showing a plurality of handles; the view showing a hand tool disengaged; the view showing a cable securing the hand to the pin; the view showing the pin removed from the pressure relief valve such that the hand tool can be used and the pressure released from the pressurized vessel.
Figure 10:
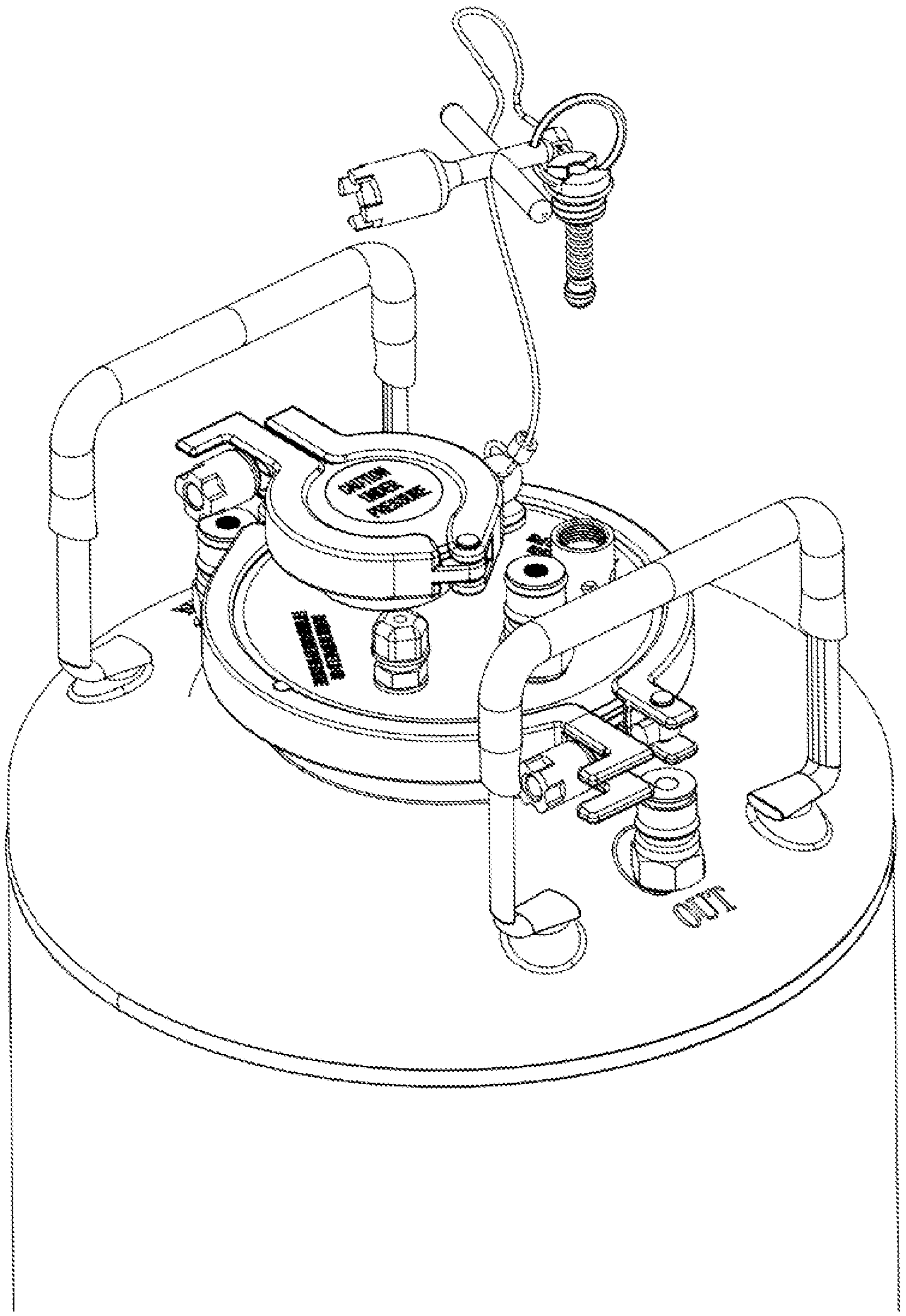
FIG. 10 is a top, perspective view; the view showing the pressurized vessel, the first tri clamp, the second tri clamp, the first tri clamp nut, and the second tri clamp nut; the view showing a plurality of handles; the view showing a hand tool disengaged; the view showing a cable securing the hand to the pin; the view showing the pin removed from the pressure relief valve such that the hand tool can be used and the pressure released from the pressurized vessel.
Figure 11:
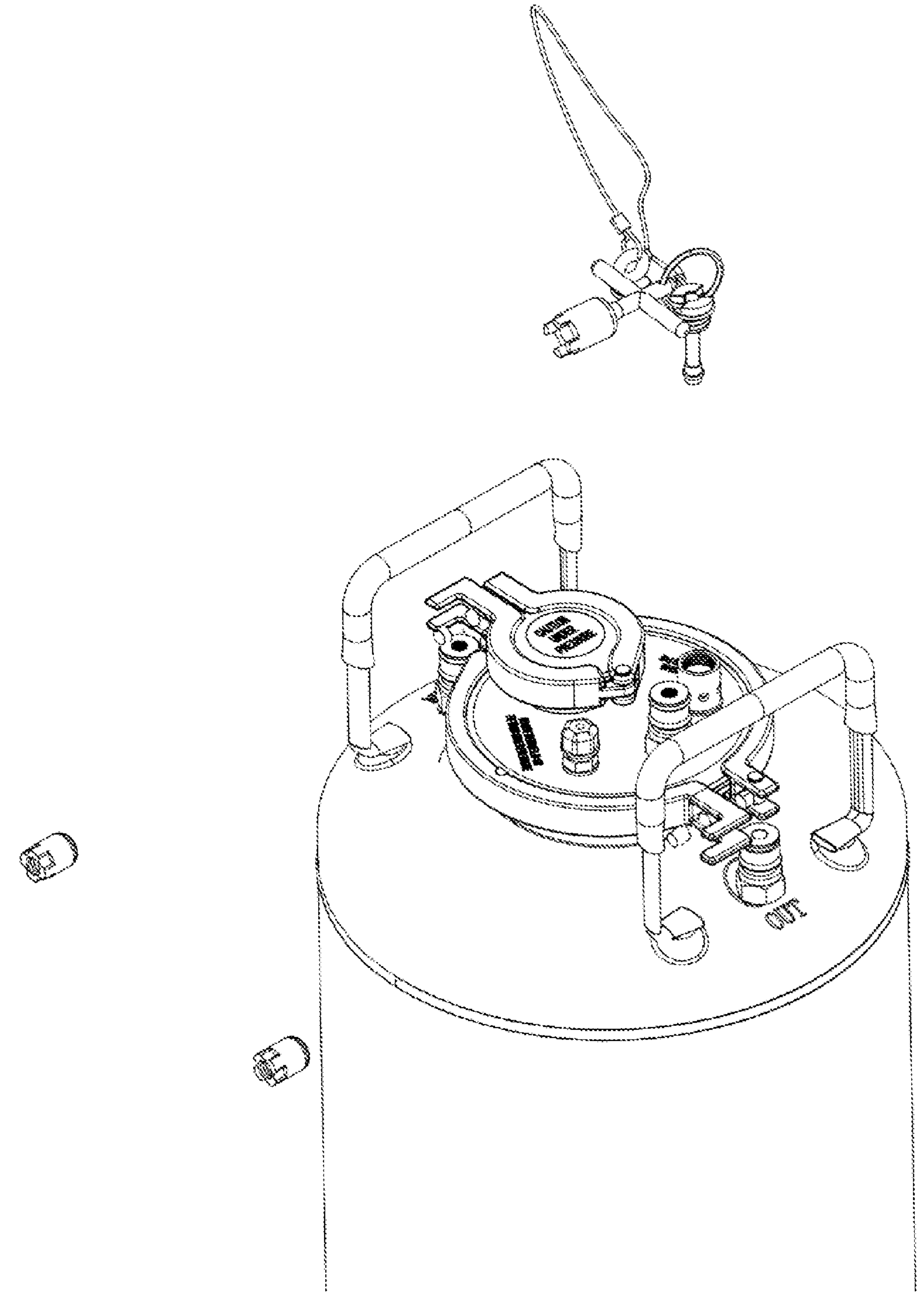
FIG. 11 is a top, perspective view; the view showing the pressurized vessel, the first tri clamp, the second tri clamp, the first tri clamp nut, and the second tri clamp nut; the view showing a plurality of handles; the view showing a hand tool disengaged; the view showing a cable securing the hand to the pin; the view showing the pin removed from the pressure relief valve such that the hand tool can be used and the pressure released from the pressurized vessel; the view showing the first nut and the second nut disengaged from the first tri clamp and the second tri clamp.
Figure 12:
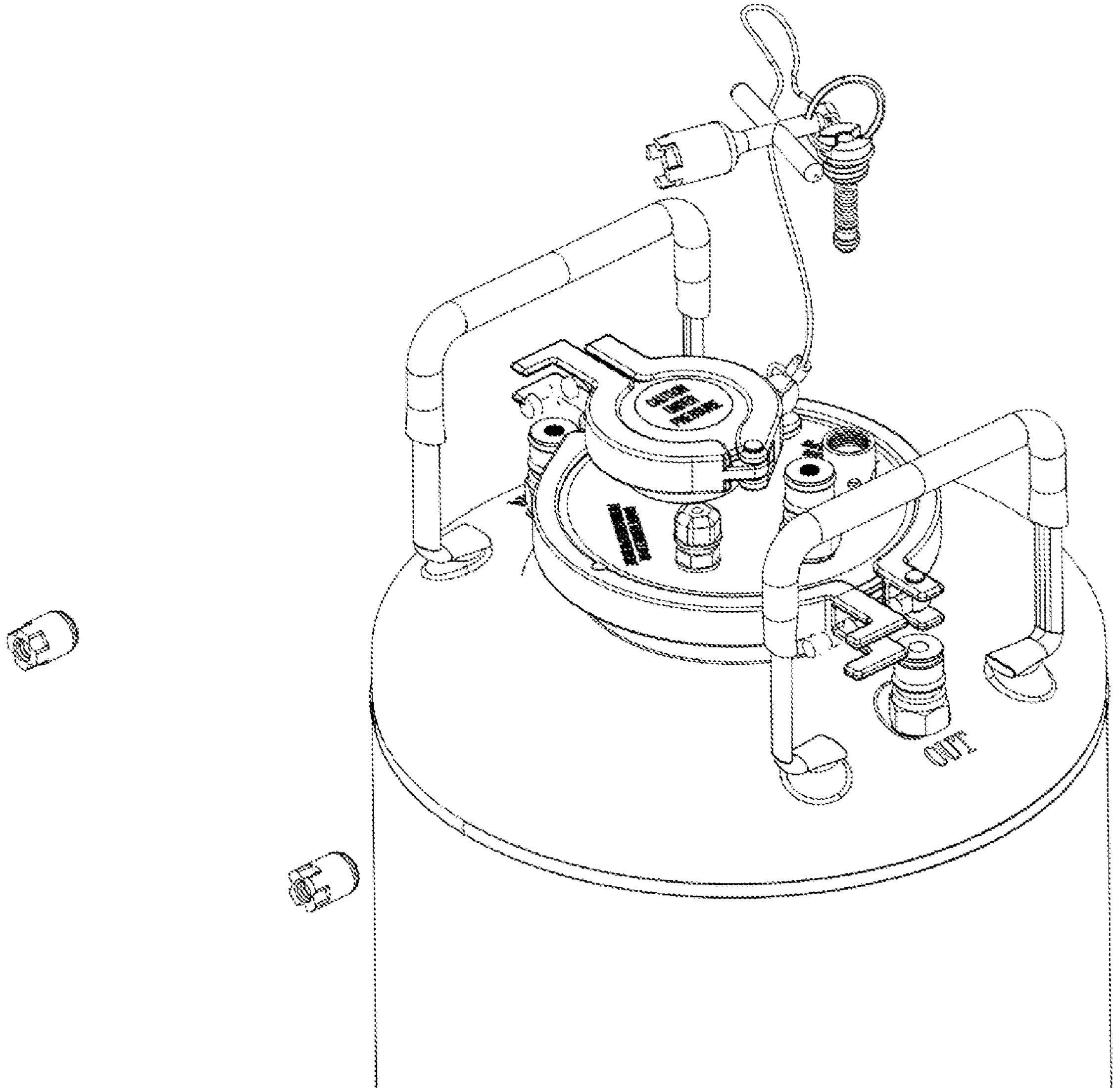
FIG. 12 is a top, perspective view; the view showing the pressurized vessel, the first tri clamp, the second tri clamp, the first tri clamp nut, and the second tri clamp nut; the view showing a plurality of handles; the view showing a hand tool disengaged; the view showing a cable securing the hand to the pin; the view showing the pin removed from the pressure relief valve such that the hand tool can be used and the pressure released from the pressurized vessel.
Figure 13:
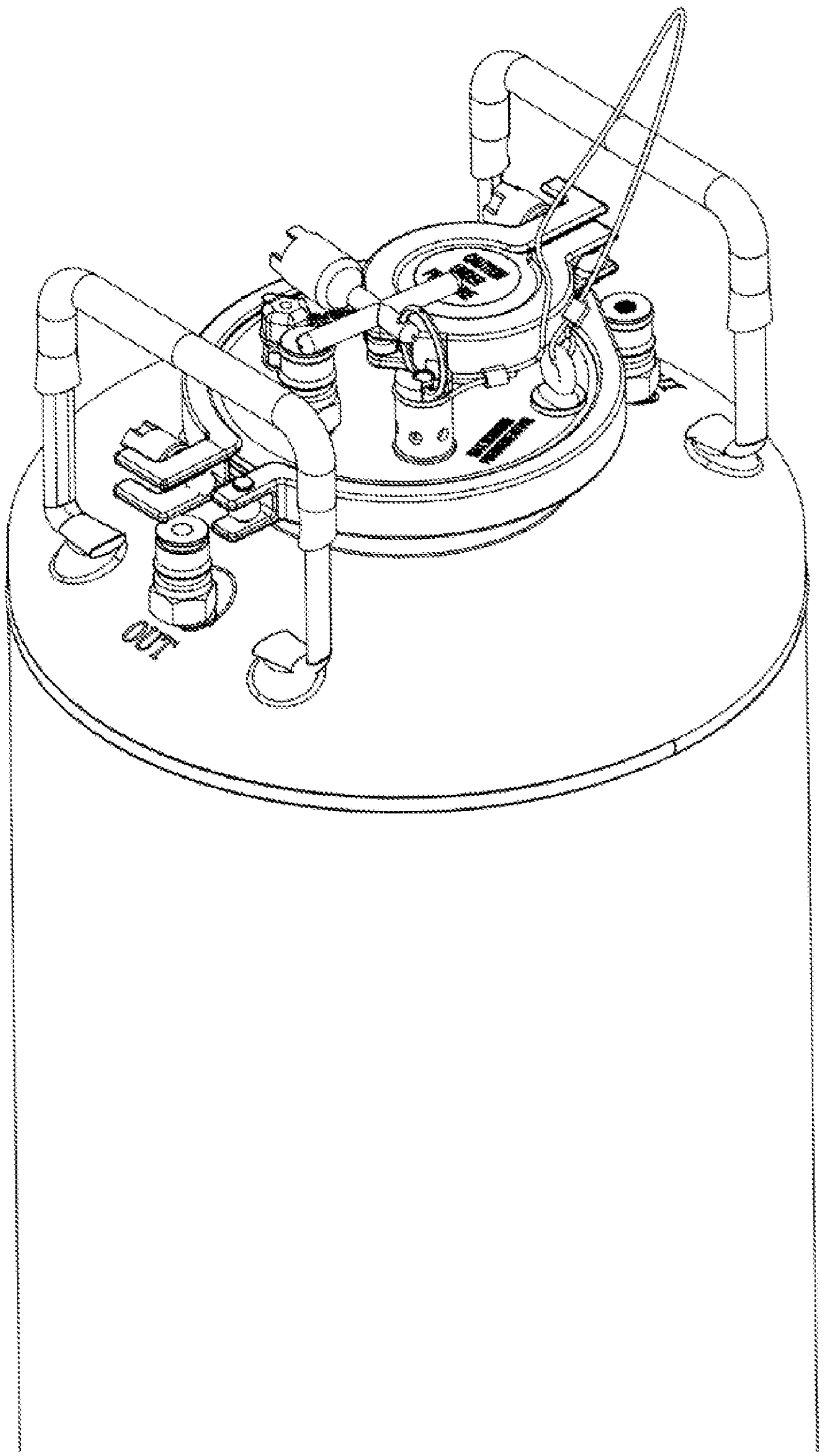
FIG. 13 is a top, perspective view; the view showing the pressurized vessel, the first tri clamp, the second tri clamp, the first tri clamp nut, and the second tri clamp nut; the view showing a plurality of handles; the view showing a hand tool disengaged; the view showing a cable securing the hand to the pin.
Figure 14:
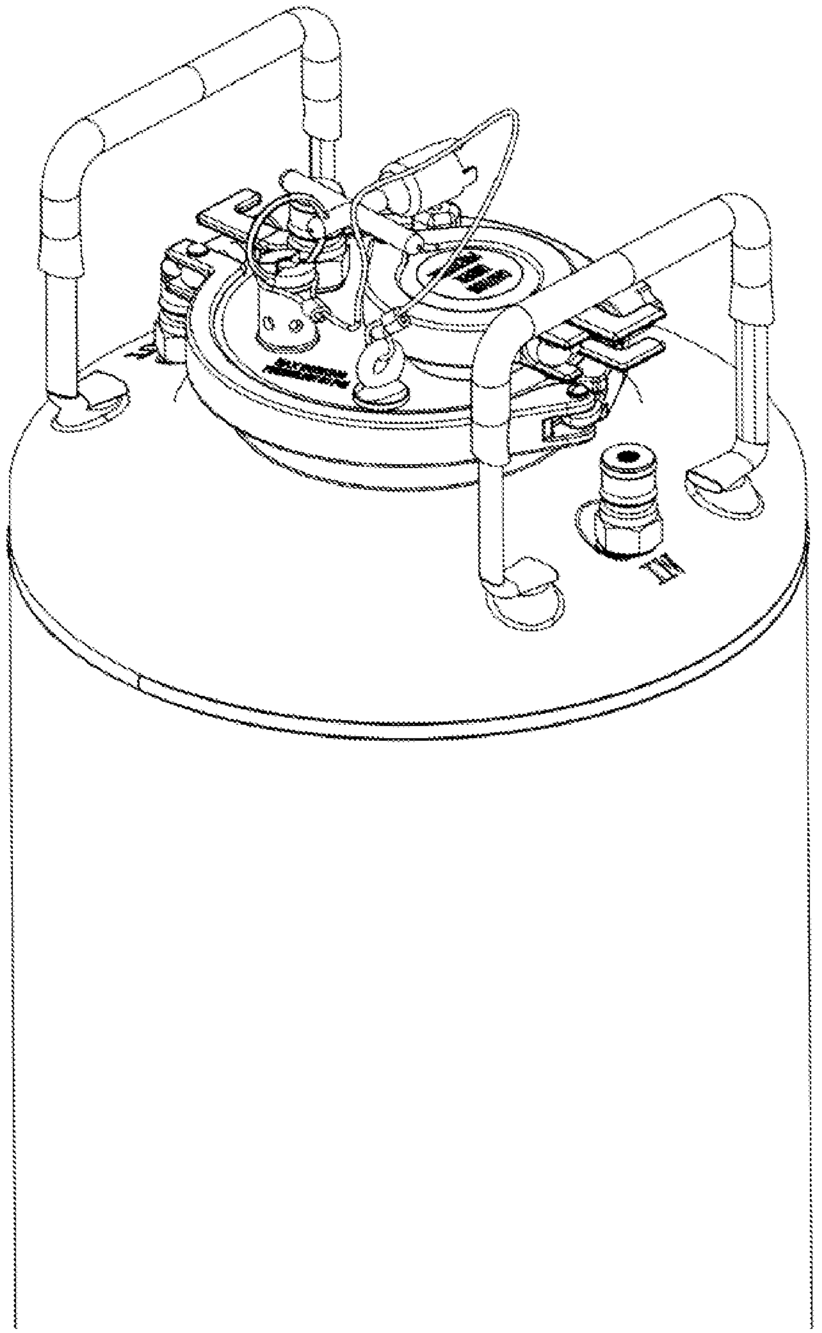
FIG. 14 is a top, perspective view; the view showing the pressurized vessel, the first tri clamp, the second tri clamp, the first tri clamp nut, and the second tri clamp nut; the view showing a plurality of handles; the view showing a hand tool disengaged; the view showing a cable securing the hand to the pin.
Figure 15:
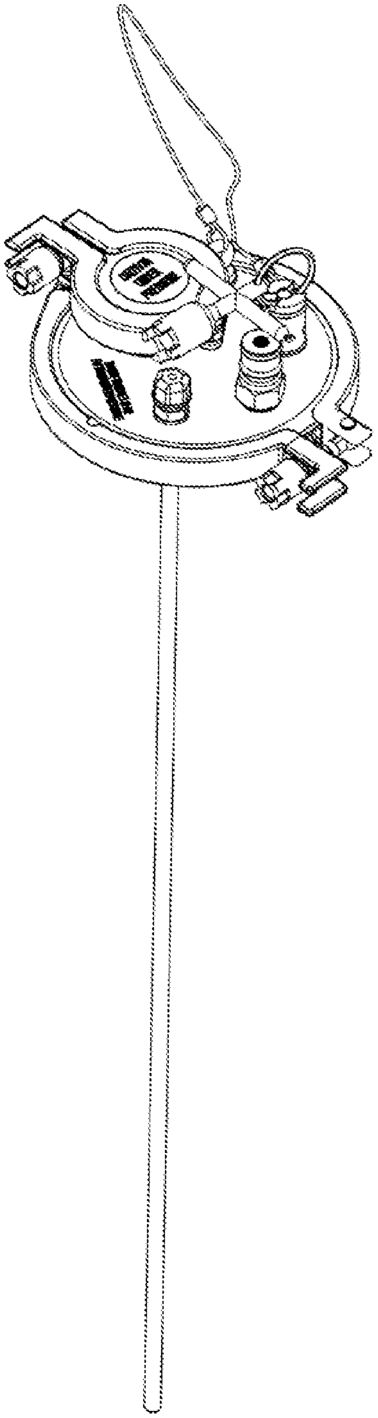
FIG. 15 is a top, perspective view; the view showing first tri clamp, the second tri clamp, the first tri clamp nut, and the second tri clamp nut; the view showing a hand tool disengaged; the view showing a cable securing the hand to the pin.
Figure 16:
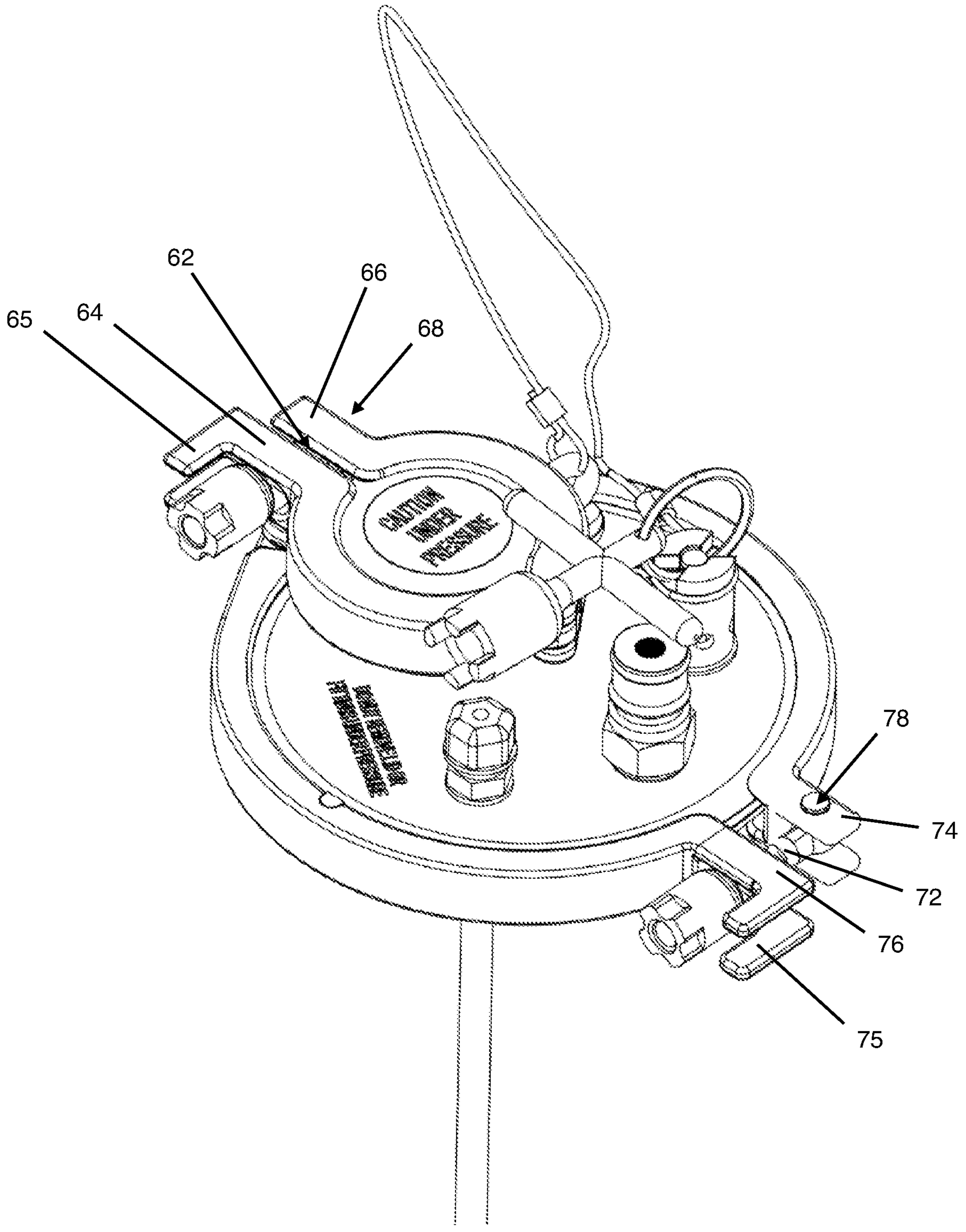
FIG. 16 is a top, perspective view; the view showing first tri clamp, the second tri clamp, the first tri clamp nut, and the second tri clamp nut; the view showing a hand tool disengaged; the view showing a cable securing the hand to the pin.
Figure 17:
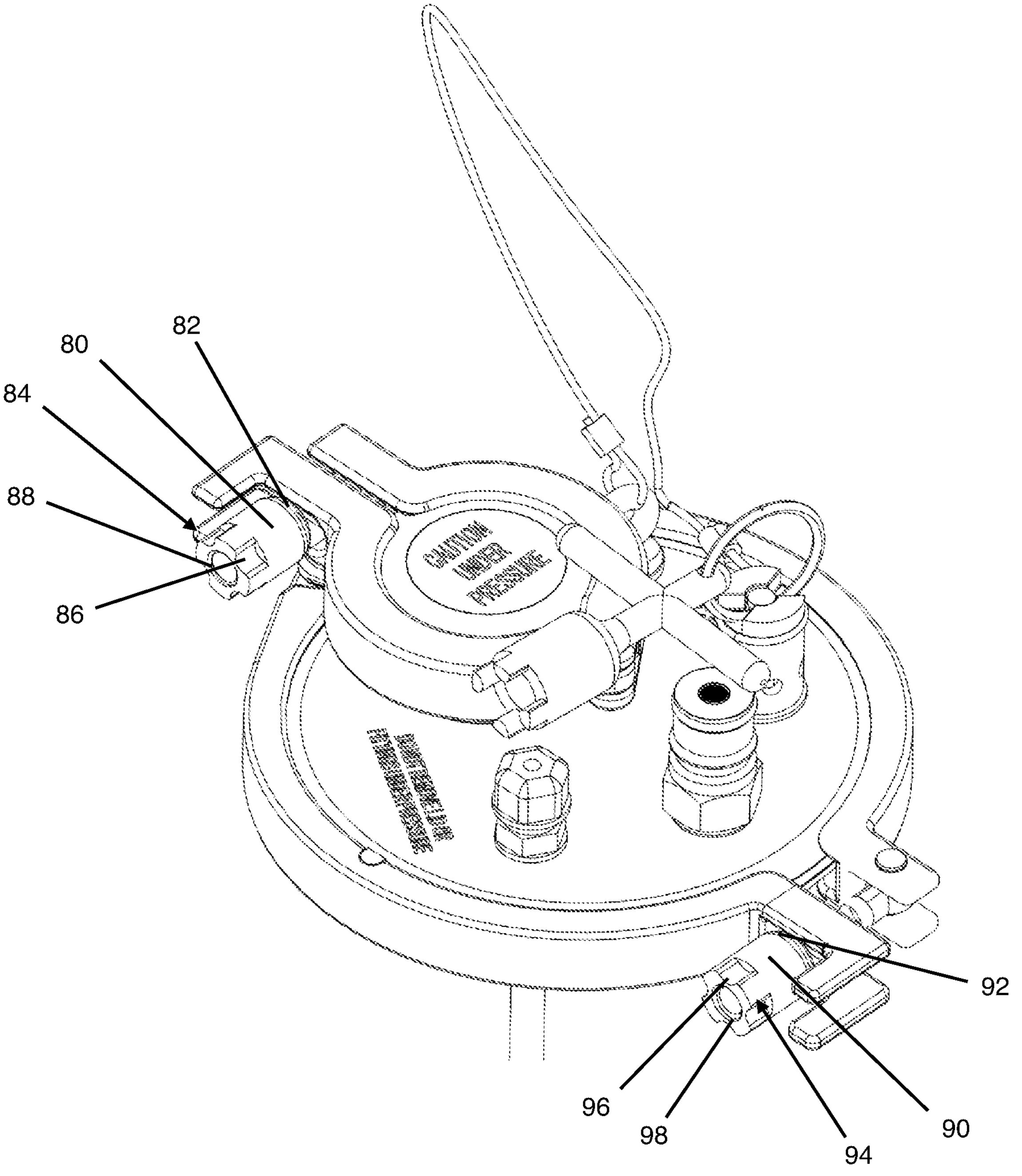
FIG. 17 is a top, perspective view; the view showing first tri clamp, the second tri clamp, the first tri clamp nut, and the second tri clamp nut; the view showing a hand tool disengaged; the view showing a cable securing the hand to the pin.
Figure 18:
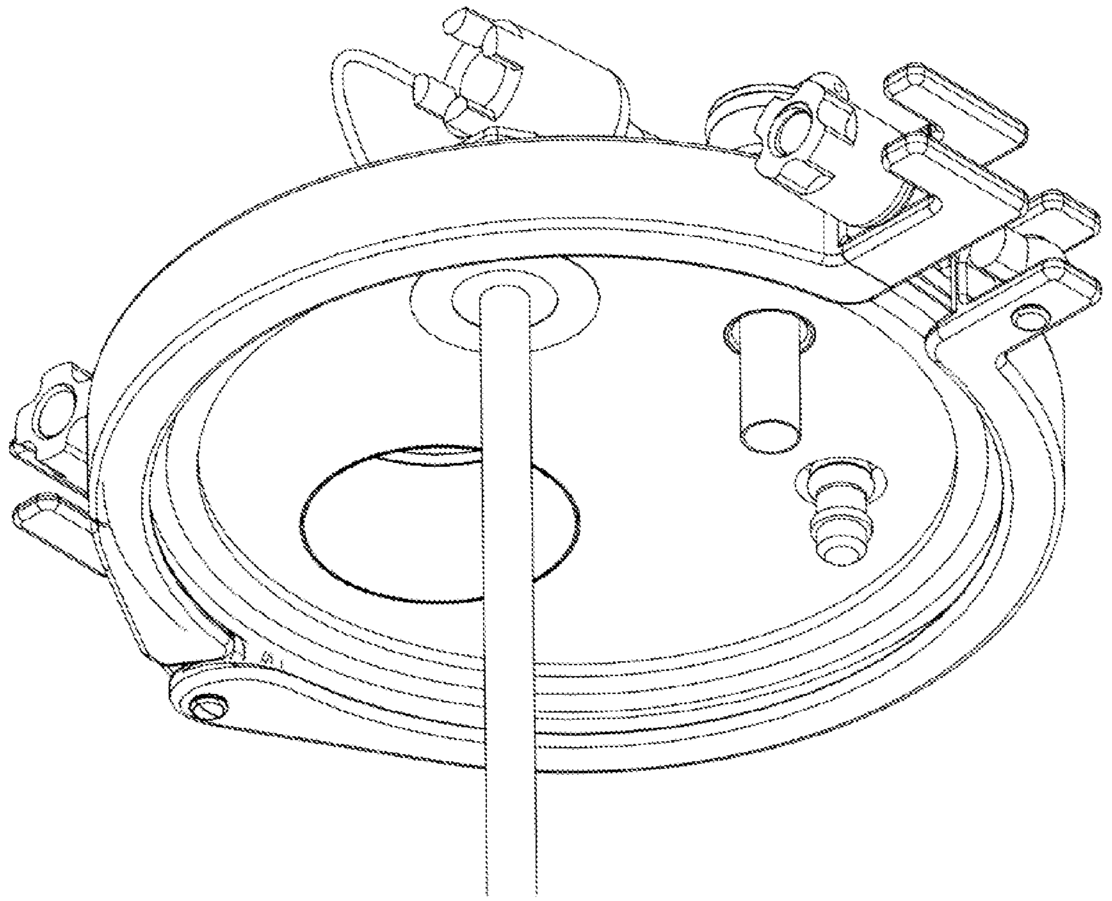
FIG. 18 is a bottom, perspective view; the view showing first tri clamp, the second tri clamp, the first tri clamp nut, and the second tri clamp nut; the view showing a plurality of handles; the view showing a hand tool disengaged; the view showing a cable securing the hand to the pin.
Figure 19:
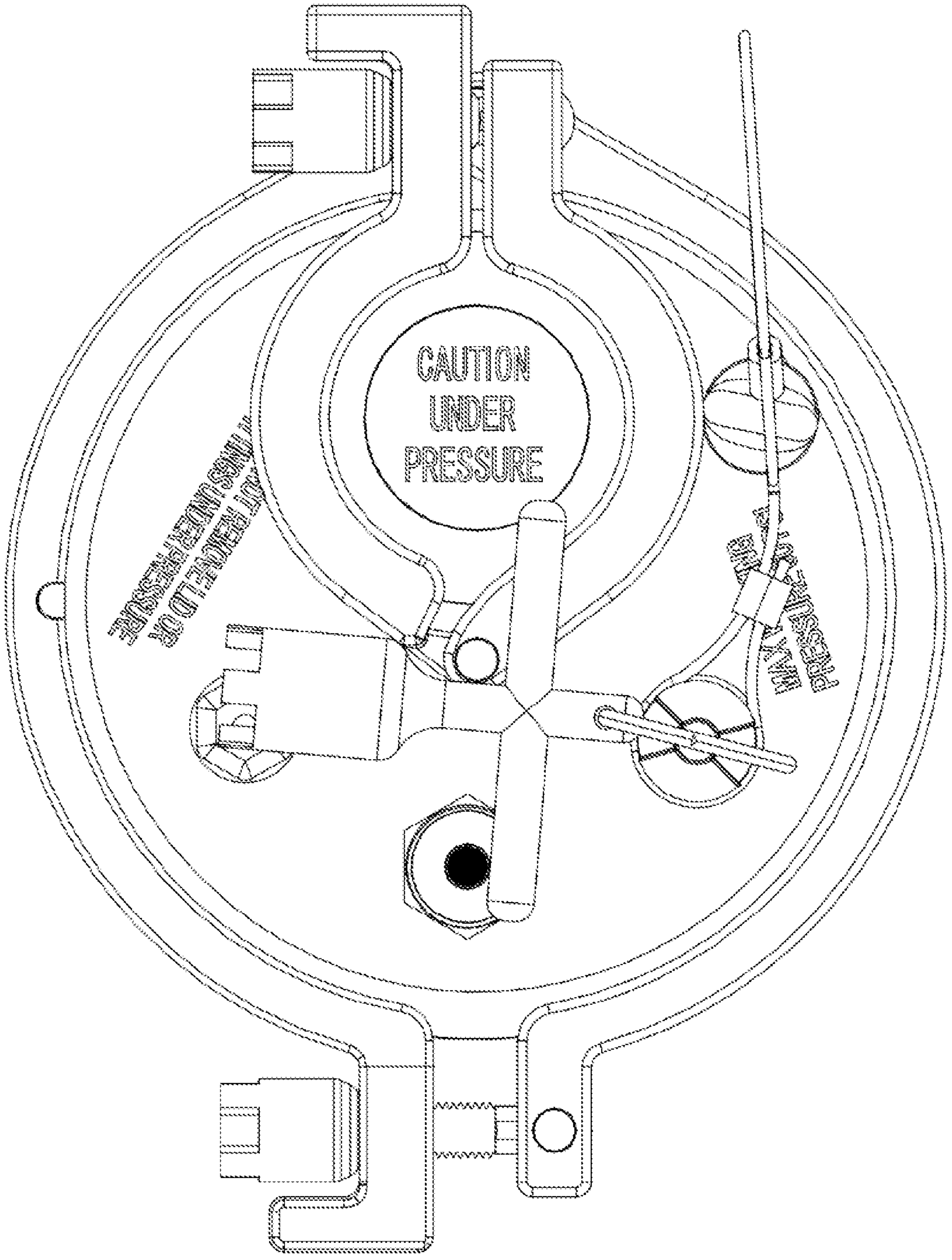
FIG. 19 is a top view; the view showing first tri clamp, the second tri clamp, the first tri clamp nut, and the second tri clamp nut; the view showing a hand tool disengaged; the view showing a cable securing the hand to the pin.
Figure 20:
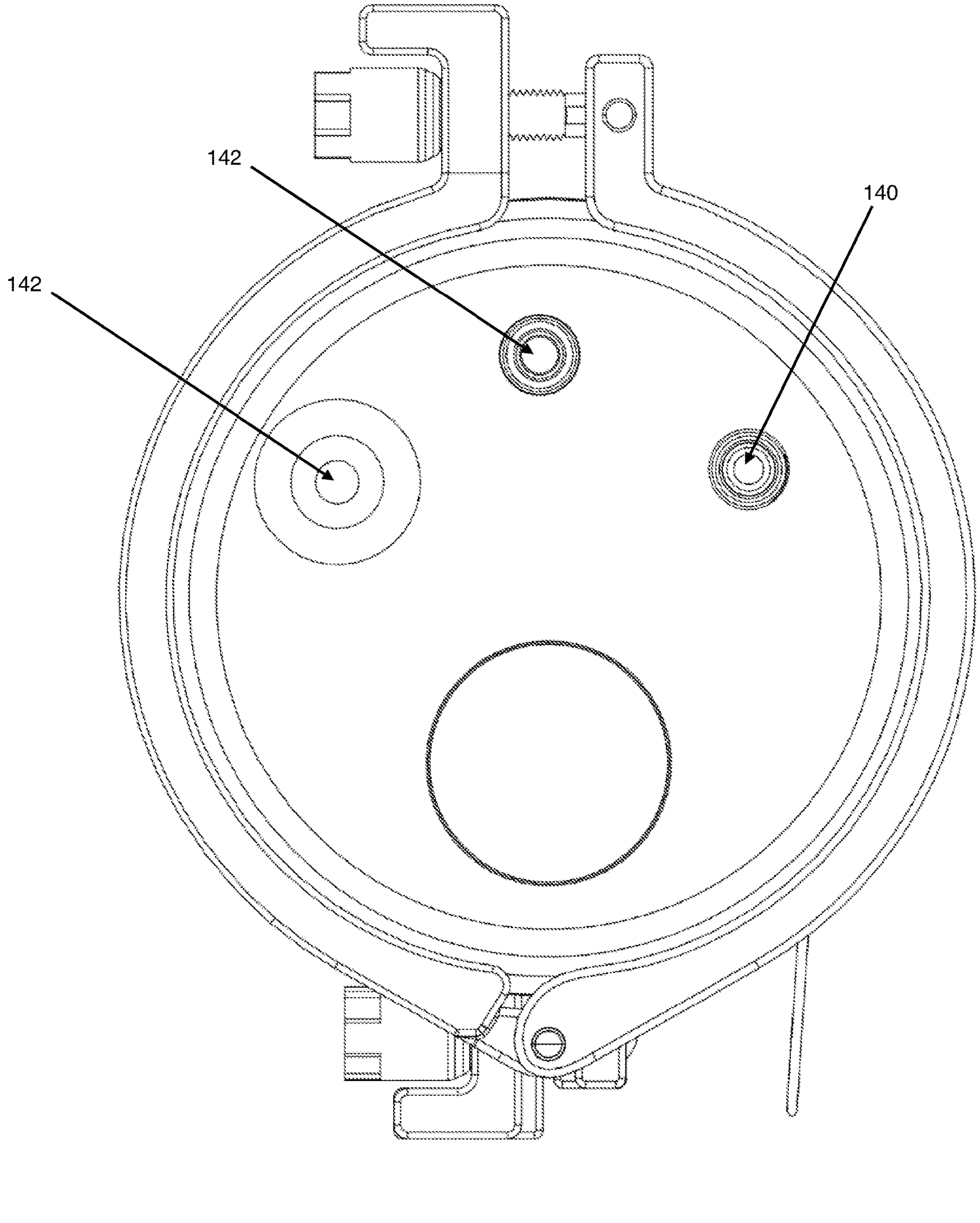
FIG. 20 is a bottom view; the view showing the second tri clamp, and the second tri clamp nut.
Figure 21:
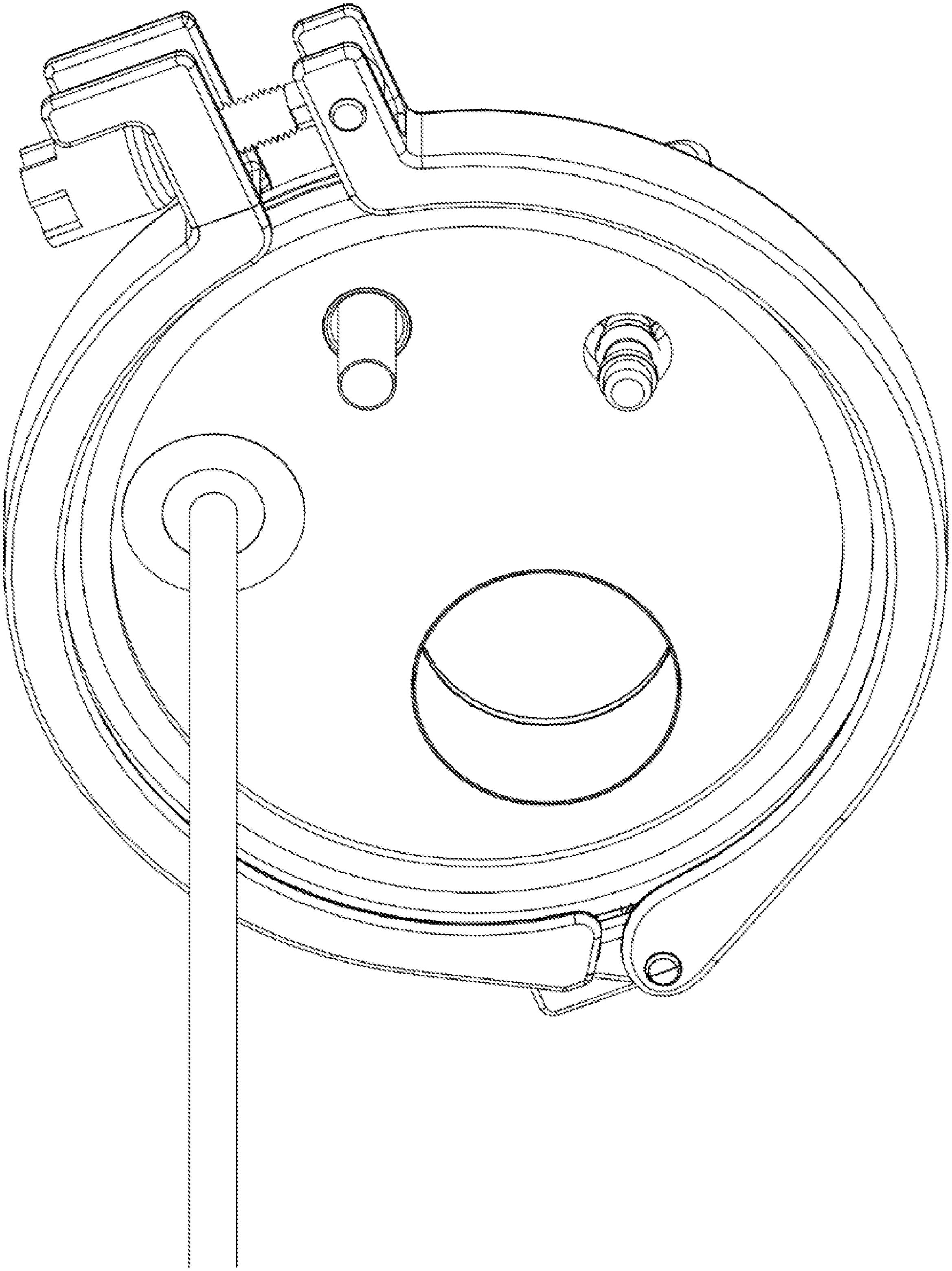
FIG. 21 is a bottom, perspective view; the view showing the second tri clamp, and the second tri clamp nut.
Figure 22:
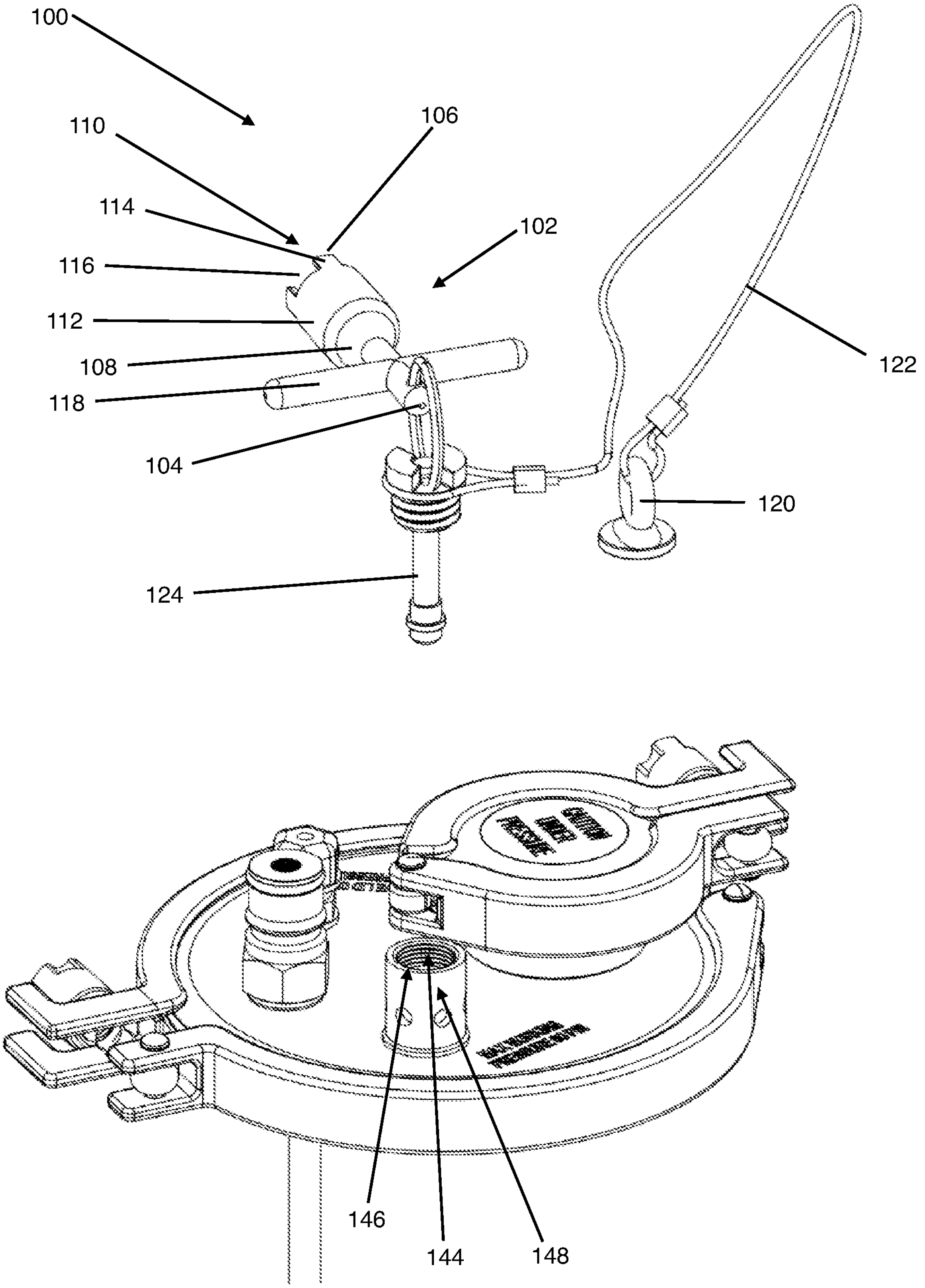
FIG. 22 is a top, perspective view; the view showing first tri clamp, the second tri clamp, the first tri clamp nut, and the second tri clamp nut; the view showing a hand tool disengaged; the view showing a cable securing the hand to the pin.
Figure 23:
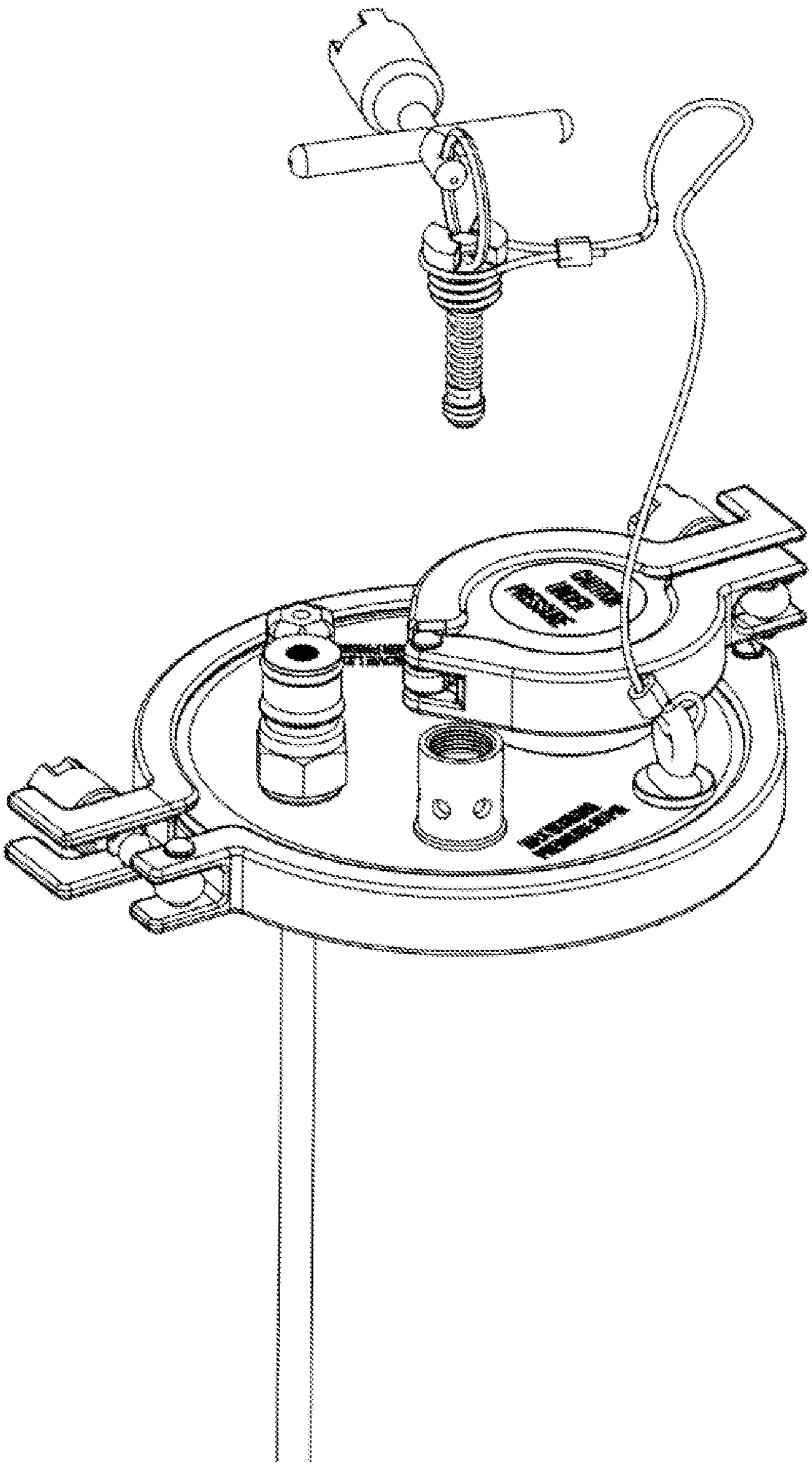
FIG. 23 is a top, perspective view; the view showing first tri clamp, the second tri clamp, the first tri clamp nut, and the second tri clamp nut; the view showing a hand tool disengaged; the view showing a cable securing the hand to the pin.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure (s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer removable drive, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

System:

With reference to the figures, a pressure safety device and tool for operating said device, a pressurized container system, process, and methods of use 10 (hereafter referred to as "pressure relief system", "vessel pressure system", "pressure valve system", "hand tool system", or simply "system") is formed of any suitable size, shape and design.

In the arrangement shown, as one example, the pressure relief system 10 is configured to provide a removable pressure relief tool and a unique and novel new tri clamp nut assembly, and new tri clamp nut. The present disclosure improves upon the state of the art by providing the state of the art with a decrease in the risk of injury associated with the accidental removal of a tri clamp fitting from pressurized vessels. Furthermore, the present disclosure provides a unique system which renders the tool inaccessible unless removed from the vessel, which causes depressurization. Said another way, the present disclosure, and unique tri clamp nut further described herein, can not be removed without the tool.

In the arrangement shown, as one example, pressure relief system 10 includes, in the embodiment(s) depicted, a vessel 30, a first tri clamp 60, may also include a second tri clamp 70, a first tri clamp nut 80, may also include a second tri clamp nut 90, a hand tool 100, a pressure relief valve 140, and the like.

In the arrangement shown, as one example, pressure relief system 10 may also comprise remote servers, databases, application servers, application databases, keg databases, mobile applications, pressure measuring sensors, pressure monitoring systems, remote pressure adjustment features, and/or computers; all of which in continuity or as separate acts fulfill the functions disclosed herein, such as a graphical user interface, a computing platform, a sensor system, a user and/or operator, and communication and control components, among other components, features, and functionality.

User/Operator (or Plurality Thereof):

In the arrangement shown, as one example, system 10 includes a user or operator. User or operator may be any user interacting with or utilizing the system 10. This may include transporting, brewing, storing, serving, manipulating, interacting with, cleaning, monitoring, adjusting, and the like, with system 10. User/operator is not limited to a single user but may be a plurality of users.

Vessel:

In the arrangement shown, as one example, system 10 includes a vessel 30 (also referred to as “pressurized vessel”, “container”, “pressurized container”, “pressurized keg”, or simply “keg”). Pressurized vessel is formed of any suitable size, shape, and design, and is configured to house or hold gasses and/or liquids at a pressure state which is different from ambient pressure. In the present disclosure, a keg holding a pressurized liquid is often referred to for ease of explanation and example. However, a keg holding a pressurized liquid is not the only system and/or application for a vessel and/or pressurized vessel. The present disclosure can be utilized in a wide variety of applications.

In the arrangement shown as one example, the pressurized container 30 extends a length 32 from a first end 34 (or a “top”) to a second end 36 (or a “bottom”). The bottom 36, for ease of explanation herein, is generally, the part of the container which rests on the ground, shelf, or transport. The pressurized container 30 also includes an outer wall 38, an inner wall 40, a hollow interior 41, an exterior surface 42, an interior surface 44, and may also comprise an insulation layer. This insulation layer may be a vacuum, a hollow space, an insulated space or the like.

In the arrangement shown, as one example, system 10 is most commonly used to refer to tanks which are pressurized a separate carbon dioxide tank and/or nitrogen tank and/or mix of carbon dioxide and nitrogen, among other pressurized gasses. However, system 10 may also be pressurized by other means such as a standalone pressurization, as might occur during a fermentation process.

Furthermore, and in the arrangement shown as one example, the container 30 may also include a plurality of handles 48—for easily lifting or aiding in moving or handling the container, a plurality of apertures 50 or openings which provide for access to the hollow interior 41—in this way, an operator can add and/or remove contents and/or clean the interior of the vessel 30. Furthermore, the container may also include a base 50, such as a rubber ring or other supporting structure for interfacing the vessel with a ground or other surface.

In the arrangement shown, as one example, the container 30 may also include a first lid 54 and may also include a second lid 56, along with a pressure relief system or access system 58. These and other features are hereby contemplated, along with other features and functionality which may be found in state of the art containers and/or pressurized vessels, pressure relief applications, and the like.

First Tri Clamp:

In the arrangement shown, as one example, system 10 includes a first tri clamp 60 (also referred to as “catch”, “latch”, “tri clamp”, or simply “clamp”). First tri clamp 60 is formed of any suitable size, shape, and design, and is configured to hold and/or lock in place the first lid. In the arrangement shown, as one example, the first tri clamp 60 includes a first nut 62, a first clamp arm 64 of the first tri clamp 60, a second tri clamp arm 66 of the first tri clamp 60, an attachment feature 68—connecting the first arm to the second arm, and a catch feature 69 for the first nut 62.

Tri Clamp Arm Extension: In the arrangement shown, as one example, the first tri clamp 60 includes an arm extension feature 65, 75 (also referred to as a “tri clamp finger”, “connection area”, “nub”, or simply “extension”). Arm extension feature 65 is formed of any suitable size, shape, and design and is configured to force a user and/or operator to unscrew the tri clamp nut to a particular position such that the tri clamp nut is no longer configured to put pressure on the tri clamp. Said another way, the arm extension feature 65 is a safety feature which is designed and shaped such that a user must fully or mostly loosen the tri clamp nut before the tri clamp can swing open and/or partially open.

In the arrangement shown, as one example, the tri clamp finger 65 is formed as a 90 degree bend or approximate perpendicular attachment near the end of the tri clamp arm, in the tri clamp nut connection area. The tri clamp finger 65 is configured to prevent users from attempting to manually release the tri clamp nut-pinching the tri clamp together before being able to pull the tri clamp apart. The unique shape and design of the tri clamp finger 65 blocks a user from access to the tri clamp unless the operations are completed in appropriate or successive order. This is an added safety feature for a user. Compared to existing practices, tri clamp users are able to loosen a nut of a clamp a partial amount, then slide the end of the clamp, allowing user to swing the clamp open without ever fully loosening the clamp. Said another way, the present arm extension feature 65 prevents this dangerous effect. In other words, the nut forces a user to fully loosen the nut and fully commit to proper operation.

Furthermore, the size, shape and design of the tri clamp nut involved extensive research and development. The size and shape took many iterations to develop a tri clamp nut that is the perfect size such that a user and/or operator is not able to remove the tri clamp by hand. In other words, this forces a user to use the hand tool. The current disclosure prevents and or makes it very difficult to otherwise operate the tri clamp, thus vastly improving the safety of the system. The sizing, in combination with the arm extension and hand tool designs have changed the operation of a clamp, thus creating the unique disclosure herein of a tri-clamp system and associated safety features.

Furthermore, the arrangement shown is of particular use and importance in the operation of fermentation kegs and fermentation operations. Said another way, traditional kegs in the state of the art do have some safety systems built in, such as known safety features which prevent lid removal under pressure. However, the existing designs are not suitable for small or fermentation keg applications but are otherwise configured for industrial applications and are limited to pressure and a malfunction of the device under great pressures. This teaches away from the present design which allows for fermentation of home brewing and commercial fermentation in concert with use of tri-clamp fittings.

Second Tri Clamp:

In the arrangement shown, as one example, system 10 includes a second tri clamp 70 (also referred to as “catch”, “latch”, “tri clamp”, or simply “clamp”). Second tri clamp 70 is formed of any suitable size, shape, and design, and is configured to hold and/or lock in place the second lid. In the arrangement shown, as one example, the second tri clamp 70 includes a second nut 72, a second clamp arm 74 of the second tri clamp 70, a second tri clamp arm 77 of the second tri clamp 70, an attachment feature 78-connecting the second arm to the second arm, and a catch feature 79 for the second nut 72.

First Tri Clamp Nut:

In the arrangement shown, as one example, system 10 includes a first tri clamp nut (also referred to as “tri clamp closure feature”, “tri clamp securement feature”, or simply “Nut”). Securement feature 80 is formed of any suitable size, shape, and design, and is configured to secure and/or unsecure the first tri clamp. The first tri clamp nut 80 includes a threaded fitting 82, a head 84, a plurality of head prong fittings 86, and a head thread feature 88.

In the arrangement shown, as one example, the tri clamp nut includes three pronged outlet features for accepting the three prongs of the hand tool (to be further described herein). However, other numbers of prong features are also hereby contemplated for use as may be desired in various applications. This may include 1 prong feature, 2 prong features, 4 prong features, or more.

Second Tri Clamp Nut:

In the arrangement shown, as one example, system 10 includes a second tri clamp nut (also referred to as “tri clamp closure feature”, “tri clamp securement feature”, or simply “Nut”). Securement feature 90 is formed of any suitable size, shape, and design, and is configured to secure and/or unsecure the second tri clamp. The second tri clamp nut 90 includes a threaded fitting 92, a head 94, a plurality of head prong fittings 96, and a head thread feature 98.

In the arrangement shown, as one example, the tri clamp nut includes three pronged outlet features for accepting the three prongs of the hand tool (to be further described herein). However, other numbers of prong features are also hereby contemplated for use as may be desired in various applications. This may include 1 prong feature, 2 prong features, 4 prong features, or more.

Hand Tool:

In the arrangement shown, as one example, system 10 includes a hand tool 100 (also referred to as “locking mechanism”, “unlocking mechanism”, or simply “tool”). Tool 100 is formed of any suitable size, shape, and design, and is configured to provide a unique access device for accessing the vessel. In other words, the tool 100 is configured as unique shape and design so as to only allow pressure changes and access of the pressurized vessel through removal of tri clamp nuts and the like via the tool 100.

In the arrangement shown, as one example, the tool 100 extends a length 102 from a first end 104 (or base end) to a second end 106 (or head end). The tool 100 has a back 108 and a front 110 and includes a head 112. The head 112 of the tool includes a plurality of prongs 114 which extend perpendicular to the length of the tool 100 an approximate distance from the head of the tool 100. The tool 100 also includes an aperture 116 at the approximate center of the head 112 which provides additional functionality. In the arrangement shown, as one example, the tool also includes a grip 118 and/or which is generally a slender portion of the length of the tool 100.

In the arrangement shown, as one example, the tool also includes an attachment feature 120. The attachment feature 120 is formed of any suitable size, shape, and design and is configured to keep the tool 100 secured and in operable concert with the vessel 30. Furthermore, and in the arrangement shown, the attachment feature 120, while allowing for use, also prevents the tool from being able to be used on a second vessel or vessel for which the tool is not in concert with. In the arrangement shown, as one example, the attachment feature is formed of a stainless steel cable or cable 122 at a particular length and secured by a pin 124 to the vessel. The cable 122 may also be attached in various ways and through other attachment features. The cable pin in the present disclosure also serves an additional safety purpose and as a release mechanism for operation of the system 10.

Pressure Relief Valve:

In the arrangement shown, as one example, system 10 includes a plurality of pressure relief valves (also referred to as “valves”, “pressure valves”, or simply “valve”). Valve 140 is formed of any suitable size, shape, and design, and is configured to release pressure at a particular point. In the arrangement shown, as one example, the pressure relief valve 140 includes a plurality of apertures 142, a screw top 144 or attachment thread, a spring, and a damper, among other pressure relief valve components and functionality.

Additional Components

In addition to the above, various additional features and the like are hereby contemplated for use. Some of these various components, include but are not limited to a thermometer, a pressure gauge, additional intake valves, additional output valves, a computing platform and/or monitoring system as is further described herein, and a sensing system.

Graphical User Interface: In the arrangement shown, as one example, system 10 may include a graphical user interface. Graphical user interface is formed of any suitable size shape and design and is configured to allow a user to view interact with, manipulate, and visually access container and/or vessel system data and information, information related thereto, and/or view various data for various environments and/or add information to system and/or environment and/or change the settings of the sensors and/or change the settings of operation of the pressurized vessel.

Display of Graphical User Interface: In the arrangement shown, as one example, system 10 may include a graphical user interface. Graphical user interface may include a display, which is configured to show and display information, including data, for review and interpretation by a user or plurality of users, or a plurality of users interacting with one another, such as with other keg operators and the like.

Computing Platform: In the arrangement shown, as one example, system 10 includes a computing platform (or “computer”, or “computer platform”). Computing platform is formed of any suitable size, shape, and design and is configured to provide computing support, power, and computing processing for both onboard computing functionality as well as communication for off-board or server computing functionality. In this way, an onboard computing system, among other components and features on top of the platform.

Onboard Computing System: In one arrangement, as is shown, system 10 may include an onboard computing system (or “onboard computing device”). Onboarding computing system is formed of any suitable size, shape, and design and configured to handle onboard computing operations, as are necessary for the operation of system 10. Onboarding computing device is connected with electronic network and/or database and/or server or cloud via communication means, bluetooth communication, bluetooth low energy chip (BLE onboard), and may include a processor, a memory, a microcontroller, a printed circuit board, a microprocessor, a receiver/transceiver, may include at least one antenna, and a global positioning system, among other components.

Remote Computing System: In one arrangement, as is shown, system 10 includes a remote computing system (or "remote computing device"). Remote computing device is formed of any suitable size, shape, and design and configured to handle onboard computing operations, as are necessary for the operation of system 10. Remote computing device is connected with electronic network and/or database and/or server or cloud via communication means and includes a processor, a memory, a microcontroller, a printed circuit board, a microprocessor, a receiver/transceiver, may include at least one antenna, a power supply, and a communications system, among other components.

Sensor System: In the arrangement shown, as one example, system 10 includes a sensor system. Sensor system is formed of any suitable size, shape, and design and may include one or more sensors and/or one or more sensing technologies. In the arrangement shown, as one example, sensor system is configured to detect and communicate information related to system 10 as well as the surroundings and/or environment of system 10.

In the arrangement shown, as one example, various sensors are utilized within system 10 to detect system status such as pressure, pressure changes, temperature, temperature changes, and other operating status parameters within system 10.

Method of Use:

In the arrangement shown, as one example, system 10 includes a key or hand tool. The hand tool is operably attached to a pressure relief valve access feature. The pressure relief valve access feature works in concert with a pressure relief valve. Such that when the pressure relief valve access feature is removed and/or detached, the pressure of the container is allowed to escape. Said another way, the key or hand tool can not be free and/or put into operation unless the pressure of the container has been released via the pressure relief valve access feature which is operably attached to the hand tool and the pressure relief valve, which operates in concert with the pressure relief valve access feature.

In this way, once the pressure relief valve access feature and hand tool have been safely removed, the pressure is restored to ambient pressure or near ambient pressure—a safe range for which the cap and other components can be opened. The key or hand tool is the only mechanism, due to the unique designs disclosed herein, which can operate the release or locking mechanism of the clamps. This further improves safety because pressure built in a container can be misleading when container caps and/or lids get sticky from residue and the like. This can cause further confusion and danger for a user.

In the arrangement shown, as one example, the nut for the clamps can be hand tightened when assembling and/or closing the container. However, when the container is under pressure, the design of the nut makes it difficult or impossible to work by hand—or without the hand tool—thus providing an added measure of safety. These unique designs and lockout features make the container safer and impossible to utilize without the appropriate locking features and safety precautions created by the features. This is amplified by the L-shape of the locking mechanism and other nubs and features of the mechanisms.

In addition to the above identified features, options, controls, and components, system 10 may also include other features and functionalities, among other options, controls, and components.

It will be appreciated by those skilled in the art that other various modifications could be made to the system, process, and method of use without parting from the spirit and scope of this disclosure. All such modifications and changes fall within the scope of the claims and are intended to be covered thereby.

The invention claimed is:

1. A pressurized vessel system, comprising:
a first tri clamp;
the first tri clamp having a first nut;
the first tri clamp having a first clamp arm;
the first clamp arm having a tri clamp extension;
the first tri clamp having a second clamp arm;
the first tri clamp having a plurality of attachment features;
a first tri clamp nut;
the first tri clamp nut having a threaded fitting;
the first tri clamp nut having a head;
the head of the first tri clamp nut having a head thread;
wherein the tri clamp extension is shaped to block or impede traditional tools from access to the first nut of the first tri clamp;
a hand tool;
a pressure relief valve;
wherein the hand tool is secured to the pressure relief valve such that pressure of the pressurized vessel must be released so that the hand tool can be used to remove the first tri clamp and a second tri clamp; wherein releasing the hand tool requires pulling a cable a distance to use the hand tool so that the hand tool can reach the first tri clamp and second tri clamp such that the distance is less than a length of the cable securing the hand tool to a pressurized vessel.

2. The system of claim 1, further comprising:
the pressurized vessel;
the pressurized vessel extending the length from a first end to a second end;
the pressurized vessel having an outer wall;
the pressurized vessel having an inner wall;
the pressurized vessel having an exterior surface;
the pressurized vessel having an interior surface;
the pressurized vessel having an insulated layer;
the pressurized vessel having a plurality of handles;
the pressurized vessel having a plurality of apertures;
the pressurized vessel having a base;
the pressurized vessel having a first lid;
the pressurized vessel having a second lid;
the pressurized vessel having a pressure relief system.

3. The system of claim 1, further comprising:
the second tri clamp;
the second tri clamp having a second nut;
the second tri clamp having a first clamp arm;
the first clamp arm of the second tri clamp having a tri clamp extension;
the second tri clamp having a second clamp arm;
the second tri clamp having a plurality of attachment features;
a second tri clamp nut;
the second tri clamp nut having a threaded fitting;
the second tri clamp nut having a head;
the head of the second tri clamp nut having a plurality of prong fittings;
the head of the second tri clamp nut having a head thread;
wherein the tri clamp extension of the second tri clamp is shaped to block or impede traditional tools from access to the second nut of the second tri clamp;
the head extending a length from a first end to a second end;

the head of the first tri clamp nut having a plurality of prong fittings; the plurality of prong fittings located at the first end of the head;

wherein the tri clamp extension of the first trip clamp prevents access to the side of the head of the first nut;

wherein preventing access to the side provides for access to the first end of the head of the second tri clamp nut.

4. The system of claim 1, further comprising:

the hand tool extending a length from a first end to a second end;

the hand tool having a back and a front;

the hand tool having a head with a plurality of prongs and an aperture;

the hand tool having a grip.

5. The system of claim 1, further comprising:

a cable attachment feature;

wherein the cable attachment feature is secured near a back of the hand tool;

the cable attachment feature connected to the cable which is connected to the cable pin;

wherein the cable pin connects to the vessel.

6. The system of claim 1, further comprising:

a cable attachment feature;

the pressure relief valve having a plurality of apertures;

the pressure relief valve having a threaded top;

the pressure relief valve having a spring;

the pressure relief valve having a damper.

7. The system of claim 1, further comprising:

a cable attachment feature.

8. The system of claim 1, further comprising:

a pressurized vessel;

the pressurized vessel extending a length from a first end to a second end;

the pressurized vessel having an outer wall;

the pressurized vessel having an exterior surface;

the pressurized vessel having an interior surface;

the pressurized vessel having a plurality of apertures.

9. The system of claim 1, further comprising:

a pressurized vessel;

the pressurized vessel extending a length from a first end to a second end;

the pressurized vessel having an outer wall;

the pressurized vessel having an inner wall;

the pressurized vessel having an exterior surface;

the pressurized vessel having an interior surface;

the pressurized vessel having an insulated layer;

the pressurized vessel having a plurality of handles;

the pressurized vessel having a plurality of apertures;

the pressurized vessel having a base;

the pressurized vessel having a first lid;

the pressurized vessel having a second lid;

the pressurized vessel having a pressure relief system.

10. The system of claim 1, further comprising:

the hand tool having a front and a back;

a cable attachment feature;

wherein the cable attachment feature is secured near the back of the hand tool;

the cable attachment feature connected to the cable which is connected to the cable pin;

wherein the cable pin connects to the vessel.

11. A relief device and tool, comprising:

a pressurized vessel;

a first tri clamp;

the first tri clamp having a first nut;

the first tri clamp having a first clamp arm;

the first clamp arm having a tri clamp extension;

the first tri clamp having a second clamp arm;

the first tri clamp having a plurality of attachment features;

a first tri clamp nut;

the first tri clamp nut having a threaded fitting;

the first tri clamp nut having a head;

the head of the first tri clamp nut having a plurality of prong fittings;

the head of the first tri clamp nut having a head thread;

wherein the tri clamp extension is shaped to block or impede traditional tools from access to the first nut of the first tri clamp;

a second tri clamp;

the second tri clamp having a second nut;

the second tri clamp having a first clamp arm;

the first clamp arm of the second tri clamp having a tri clamp extension;

the second tri clamp having a second clamp arm;

the second tri clamp having a plurality of attachment features;

a second tri clamp nut;

the second tri clamp nut having a threaded fitting;

the second tri clamp nut having a head;

the head of the second tri clamp nut having a plurality of prong fittings;

the head of the second tri clamp nut having a head thread;

wherein the tri clamp extension prevents access to the side of the head of the second tri clamp nut; wherein preventing access to the side provides for access to the first end of the head of the second tri clamp nut;

a hand tool;

the hand tool having a back and a front;

a cable attachment feature;

the cable attachment feature connected to a cable which is connected to a cable pin;

wherein the cable pin connects to the vessel;

a pressure relief valve;

wherein the hand tool is secured to the pressure relief valve such that pressure of the pressurized vessel must be released so that the hand tool can be used to remove the first tri clamp and the second tri clamp; wherein releasing the hand tool requires pulling the cable a distance to use the hand tool so that the hand tool can reach the first tri clamp and second tri clamp such that the distance is less than the length of the cable securing the hand tool to the pressurized vessel.

12. The system of claim 11, further comprising:

the pressurized vessel extending a length from a first end to a second end;

the pressurized vessel having an outer wall;

the pressurized vessel having an inner wall;

the pressurized vessel having an exterior surface;

the pressurized vessel having an interior surface;

the pressurized vessel having an insulated layer;

the pressurized vessel having a plurality of handles;

the pressurized vessel having a plurality of apertures;

the pressurized vessel having a base;

the pressurized vessel having a first lid;

the pressurized vessel having a second lid;

the pressurized vessel having a pressure relief system.

13. The system of claim 11, further comprising:

the pressure relief valve having a plurality of apertures;

the pressure relief valve having a threaded top;

the pressure relief valve having a spring;
the pressure relief valve having a damper.

14. The system of claim 11, further comprising:
the hand tool extending a length from a first end to a second end;
the hand tool having a head with a plurality of prongs and an aperture;
the hand tool having a grip.

15. The system of claim 11, further comprising:
wherein the cable attachment feature is secured near the back of the hand tool.

16. The system of claim 11, further comprising:
wherein the hand tool causes the first nut to rotate by accessing the top of the first nut;
wherein a plurality of prongs of the hand tool engage with a plurality of prong apertures of the first nut so as to cause the release nut to disengage; where disengaging is rotating about a threaded fitting releasing the tri clamp.

17. The system of claim 11, further comprising:
wherein the hand tool causes the first nut to rotate by accessing the top of the first nut;
wherein a plurality of prongs of the hand tool engage with a plurality of prong apertures of the first nut so as to cause the release first nut to disengage; where disengaging is rotating about a threaded fitting releasing the first tri clamp;
wherein the hand tool causes the second nut to rotate by accessing the top of the second nut;
wherein a plurality of prongs of the hand tool engage with a plurality of prong apertures of the second nut so as to cause the second nut to disengage; where disengaging is rotating about a threaded fitting releasing the second tri clamp.

18. The system of claim 11, further comprising:
wherein the hand tool causes the first nut to rotate by accessing the top of the first nut;
wherein a plurality of prongs of the hand tool engage with a plurality of prong apertures of the first nut so as to cause the release first nut to disengage; where disengaging is rotating about a threaded fitting of a bolt operably connected to the first extension of the first tri clamp, releasing the first tri clamp;
wherein the hand tool causes the second nut to rotate by accessing the top of the second nut;
wherein a plurality of prongs of the hand tool engage with a plurality of prong apertures of the second nut so as to cause the second nut to disengage; where disengaging is rotating about a threaded fitting of a bolt operably connected to the first extension of the second tri clamp, releasing the second tri clamp.

19. A method of safely controlling pressure of a pressurized vessel, comprising the steps:
providing a pressurized vessel;
providing a tri clamp; the tri clamp having a tri clamp extension; the tri clamp having a release nut;
preventing access to the release nut by the tri clamp extension covering the side of the release nut;
providing a hand tool; wherein the hand tool causes the release nut to rotate by accessing the top of the nut;
providing a cable attachment feature; wherein the cable attachment feature connects the hand tool to the pressurized vessel;
engaging a plurality of prongs of the access tool with a plurality of prong apertures of the release nut so as to cause the release nut to disengage; where disengaging is rotating about a threaded fitting releasing the tri clamp;
providing a pressure relief valve; wherein the hand tool is secured to the pressure relief valve such that pressure of the pressurized vessel must be released so that the hand tool can be used to remove the first tri clamp and the second tri clamp;
wherein releasing the hand tool requires pulling the cable a distance to use the hand tool so that the hand tool can reach the first tri clamp and second tri clamp such that the distance is less than the length of the cable securing the hand tool to the pressurized vessel.

* * * * *